United States Patent
Chen et al.

(10) Patent No.: US 12,069,293 B2
(45) Date of Patent: *Aug. 20, 2024

(54) ADAPTIVE INTERPOLATION FILTER

(71) Applicant: Huawei Technologies Co., Ltd., Shenzhen (CN)

(72) Inventors: Huanbang Chen, Shenzhen (CN); Haitao Yang, Shenzhen (CN); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

This patent is subject to a terminal disclaimer.

(21) Appl. No.: 17/472,235

(22) Filed: Sep. 10, 2021

(65) Prior Publication Data

US 2022/0070488 A1    Mar. 3, 2022

Related U.S. Application Data

(63) Continuation of application No. 16/838,954, filed on Apr. 2, 2020, now Pat. No. 11,146,809, which is a (Continued)

(51) Int. Cl.
*H04N 19/176* (2014.01)
*H04N 19/52* (2014.01)
(Continued)

(52) U.S. Cl.
CPC ........... *H04N 19/52* (2014.11); *H04N 19/176* (2014.11); *H04N 19/625* (2014.11); *H04N 19/80* (2014.11)

(58) Field of Classification Search
CPC .............................. H04N 19/52; H04N 19/176
See application file for complete search history.

(56) References Cited

U.S. PATENT DOCUMENTS 8,705,622 B2    4/2014 Ye et al.
10,628,915 B1   4/2020 Lui
(Continued)

FOREIGN PATENT DOCUMENTS

EP    2559254 A2    2/2013
EP    2624558 A2    7/2013
(Continued)

OTHER PUBLICATIONS

JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, 7 pages.
(Continued)

*Primary Examiner* — Irfan Habib
(74) *Attorney, Agent, or Firm* — Conley Rose, P.C.

(57) ABSTRACT

Disclosed is a mechanism for selecting an interpolation filter for use in conjunction with an affine block in video coding. A motion vector is determined for a sub-block of the affine block based on control points. A sub-block size of the sub-block is also determined. The interpolation filter is selected for application to a reference block corresponding to the sub-block. The interpolation filter is selected based on the sub-block size. The motion vector of the sub-block and an offset of a current sample of the sub-block are employed to determine a reference sample at the reference block. This includes applying the interpolation filter to the reference block to determine the reference sample when the motion vector at the offset points to a fractional position at the reference block. The reference samples are employed to determine residual information in order to encode the affine block.

20 Claims, 12 Drawing Sheets

FIG. 5

Related U.S. Application Data continuation of application No. PCT/US2019/017652, filed on Feb. 12, 2019.

(60) Provisional application No. 62/630,607, filed on Feb. 14, 2018.

(51) Int. Cl.
  H04N 19/625 (2014.01)
  H04N 19/80 (2014.01)

(56) References Cited

U.S. PATENT DOCUMENTS

| | | |
|---|---|---|
| 2004/0213470 A1 | 10/2004 | Sato et al. |
| 2006/0294171 A1 | 12/2006 | Bossen et al. |
| 2009/0082658 A1* | 3/2009 | Hamilton ............... A61B 5/055 382/128 |
| 2010/0158103 A1 | 6/2010 | Ye et al. |
| 2011/0243471 A1 | 10/2011 | Alshina et al. |
| 2012/0134425 A1 | 5/2012 | Kossentini et al. |
| 2012/0147967 A1* | 6/2012 | Panchal ............... H04N 19/117 375/E7.125 |
| 2012/0230407 A1 | 9/2012 | Minoo et al. |
| 2013/0039428 A1 | 2/2013 | Lakshman et al. |
| 2013/0182780 A1 | 7/2013 | Alshin et al. |
| 2014/0112391 A1* | 4/2014 | Matsuo ............... H04N 19/172 375/240.16 |
| 2014/0119453 A1 | 5/2014 | Bandoh et al. |
| 2014/0198996 A1 | 7/2014 | Alshina et al. |
| 2017/0332095 A1* | 11/2017 | Zou ............... H04N 19/537 |
| 2018/0070102 A1 | 3/2018 | Zhang et al. |
| 2018/0091816 A1* | 3/2018 | Chien ............... H04N 19/91 |
| 2018/0098089 A1* | 4/2018 | Chen ............... H04N 19/136 |
| 2018/0167638 A1 | 6/2018 | Rusanovskyy |
| 2019/0089960 A1* | 3/2019 | Chen ............... H04N 19/176 |
| 2019/0230285 A1* | 7/2019 | Kim ............... H04N 19/55 |
| 2022/0078436 A1* | 3/2022 | Kim ............... H04N 19/46 |

FOREIGN PATENT DOCUMENTS

| | | |
|---|---|---|
| EP | 2624558 A2 | 8/2013 |
| EP | 3291557 A1 | 3/2016 |
| JP | 2004007337 A | 1/2004 |
| JP | 2012134870 A | 7/2012 |
| KR | 20130077646 A | 7/2013 |
| KR | 20140007076 A | 1/2014 |
| RU | 2612611 C2 | 3/2017 |
| WO | 2011128272 A2 | 10/2011 |
| WO | 2015093895 A1 | 6/2015 |
| WO | 2016184261 A1 | 11/2016 |

OTHER PUBLICATIONS

JVET-B0037_r1, Zhang, H., et al., "Performance analysis of affine inter prediction in JEM 1.0," Joint Video Exploration Team (JVET) of ITU-T SG 16 WP 3 and ISO/IEC JTC 1/SC 29/WG 11, 2nd Meeting: San Diego, USA, Feb. 20-26, 2016, 10 pages.

Matsuo, S., et al., "LCU-based Adaptive Interpolation Filter," 2012 Picture Coding Symposium, May 7-9, 2012, 4 pages.

"Series H: Audiovisual and Multimedia Systems Infrastructure of audiovisual services—Coding of moving Video Advanced video coding for generic audiovisual services," Recommendation ITU-T H.264, Jun. 2019, 836 pages.

"Series H: Audiovisual and Ultimedia Systems Infrastructure of audiovisual services—Coding of moving Video High efficiency video coding," Recommendation ITU-T H.265, Apr. 2013, 317 pages.

Document: JVET-K0185-v321, Chen, H., et al., "CE4: Affine inter prediction (Test 1.5)," Joint Video Experts Team (JVET) of ITU-T SG 16 WP 3 and ISO/IEC JTC 1/SC 29/WG 11, 11th Meeting: Ljubljana, SI, Jul. 10-18, 2018, 15 pages.

Lv, H., et al., "A Comparison of Fractional-Pel Interpolation Filters in HEVC and H.264/AVC," Conference: Visual Communications and Image Processing (VCIP), 2012 IEEE, Nov. 2012, 6 pages.

* cited by examiner

ADAPTIVE INTERPOLATION FILTER

CROSS-REFERENCE TO RELATED APPLICATIONS

The present application is a continuation of U.S. patent application Ser. No. 16/838,954 filed Apr. 2, 2020, by Huawei Technologies Co., Ltd., and titled "Adaptive Interpolation Filter," which is a continuation of International Application No. PCT/US2019/017652 filed Feb. 12, 2019, by Futurewei Technologies, Inc., and titled "Adaptive Interpolation Filter," which claims the benefit of U.S. Provisional Patent Application No. 62/630,607, filed Feb. 14, 2018 by Huanbang Chen, et al., and titled "Adaptive Interpolation Filter," which are hereby incorporated by reference.

TECHNICAL FIELD

The present disclosure is generally related to video coding, and is specifically related to generation of motion model candidate lists for coding video blocks via inter-prediction in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in an encoder. The method comprises determining, by a processor of the encoder, control points to encode an affine block from a video signal according to affine inter-prediction. The method further comprises determining, by the processor, a sub-block size of the sub-block. The method further comprises determining, by the processor, a motion vector for a sub-block of the affine block based on the control points. The method further comprises selecting, by the processor, an interpolation filter for application to a reference block corresponding to the sub-block, the interpolation filter selected based on the sub-block size. The method further comprises determining, by the processor, that a motion vector for a current sample points to a fractional position at the reference block, the motion vector for the current sample offset from the motion vector for the sub-block. The method further comprises applying, by the processor, the interpolation filter to the reference block to determine a reference sample at the fractional position. The method further comprises determining, by the processor, residual information for the sub-block based on a difference between the current sample of the sub-block and the reference sample at the reference block. The method further comprises encoding, by the processor, the control points and the residual information in a bitstream. The method further comprises transmitting, by a transmitter of the encoder, the bitstream toward a decoder to support reconstruction of the affine block as part of a video frame. For example, in affine inter-prediction a motion vector is selected for a sub-block. Then each sample of the sub-block is compared to a corresponding reference sample based on the motion vector and an offset between the current sample and the initial position of the motion vector. This process is used to determine the prediction information and residual information in inter-prediction. In some cases, the motion vector at the sample offset ends up pointing to a fractional position at the reference frame. An interpolation filter is applied to determine an effective value for a reference sample at the fractional position so the samples can be compared. Filters vary in complexity with complex filters providing more accuracy at the cost of processing resources at both the encoder and decoder. Further, smaller blocks tend to match movement more accurately than larger blocks. The disclosed embodiment includes selecting an interpolation filter based on sub-block size rather than trying to apply a single interpolation filter to all sub-blocks. For example, less complicated filters are selected for sub-blocks that are smaller than a threshold and more complicated and powerful interpolation filters are employed for sub-blocks that are larger than a threshold. This allows less complex filters to be employed when the movement between frames matches well and little conflicting data exists and allows more complex filters to be employed when the motion is more complex.

Optionally, in any of the preceding aspects, another implementation of the aspect provides, wherein the interpolation filter is selected to include a first number of taps when the sub-block size is greater than a threshold and is selected to include a second number of taps when the sub-block size is less than or equal to the threshold, and wherein the first number of taps is larger than the second number of taps. Complexity of an interpolation filter can be measured in terms of a number of taps (e.g., coefficients and/or terms) used in the filter. In this embodiment, more complex filters with more taps are employed for larger sub-blocks and less complex filters with fewer taps are employed for smaller sub-blocks.

Optionally, in any of the preceding aspects, another implementation of the aspect provides, wherein the interpolation filter is selected as a discrete cosine transform interpolation filter (DCT-IF) with six taps, eight taps, or twelve taps when the sub-block size is greater than the threshold.

Optionally, in any of the preceding aspects, another implementation of the aspect provides, wherein the interpolation filter is selected as a DCT-IF with four taps or six taps when the sub-block size is less than or equal to the threshold.

Optionally, in any of the preceding aspects, another implementation of the aspect provides, wherein the interpolation filter is selected as a warping interpolation filter (WIF) with five taps when the sub-block size is less than or equal to the threshold.

Optionally, in any of the preceding aspects, another implementation of the aspect provides, wherein the sub-block size is determined based on a motion vector difference between the control points for the affine block, a width of the affine block, and a height of the affine block.

Optionally, in any of the preceding aspects, another implementation of the aspect provides, wherein the sub-block size is determined from a three dimensional lookup table indexed by a motion vector difference between control points for the affine block, a size of the affine block, and a motion vector precision.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the abovementioned aspects.

In an embodiment, the disclosure includes a video coding device comprising a processor configured to determine control points to encode an affine block from a video signal according to affine inter-prediction. The processor is further configured to determine a sub-block size of the sub-block. The processor is further configured to determine a motion vector for a sub-block of the affine block based on the control points. The processor is further configured to select an interpolation filter for application to a reference block corresponding to the sub-block, the interpolation filter selected based on the sub-block size. The processor is further configured to determine that a motion vector for a current sample points to a fractional position at the reference block, the motion vector for the current sample offset from the motion vector for the sub-block. The processor is further configured to apply the interpolation filter to the reference block to determine a reference sample at the fractional position. The processor is further configured to determine residual information for the sub-block based on a difference between the current sample of the sub-block and the reference sample at the reference block. The processor is further configured to encode the control points and the residual information in a bitstream. The video coding device also comprises a transmitter coupled to the processor, the transmitter configured to transmit the bitstream toward a decoder to support reconstruction of the affine block as part of a video frame. The disclosed embodiment includes selecting an interpolation filter based on sub-block size rather than trying to apply a single interpolation filter to all sub-blocks. For example, less complicated filters are selected for sub-blocks that are smaller than a threshold and more complicated and powerful interpolation filters are employed for sub-blocks that are larger than a threshold. This allows less complex filters to be employed when the movement between frames matches well and little conflicting data exists and allows more complex filters to be employed when the motion is more complex.

Optionally, in any of the preceding aspects, another implementation of the aspect provides, wherein the interpolation filter is selected to include a first number of taps when the sub-block size is greater than a threshold and is selected to include a second number of taps when the sub-block size is less than or equal to the threshold, and wherein the first number of taps is larger than the second number of taps. Complexity of an interpolation filter can be measured in terms of a number of taps (e.g., coefficients and/or terms) used in the filter. In this embodiment, more complex filters with more taps are employed for larger sub-blocks and less complex filters with fewer taps are employed for smaller sub-blocks.

Optionally, in any of the preceding aspects, another implementation of the aspect provides, wherein the interpolation filter is selected as a DCT-IF with six taps, eight taps, or twelve taps when the sub-block size is greater than the threshold.

Optionally, in any of the preceding aspects, another implementation of the aspect provides, wherein the interpolation filter is selected as a DCT-IF with four taps or six taps when the sub-block size is less than or equal to the threshold.

Optionally, in any of the preceding aspects, another implementation of the aspect provides, wherein the interpolation filter is selected as a WIF with five taps when the sub-block size is less than or equal to the threshold.

Optionally, in any of the preceding aspects, another implementation of the aspect provides, wherein the sub-block size is determined based on a motion vector difference between the control points for the affine block, a width of the affine block, and a height of the affine block.

Optionally, in any of the preceding aspects, another implementation of the aspect provides, wherein the sub-block size is determined from a three dimensional lookup table indexed by a motion vector difference between control points for the affine block, a size of the affine block, and a motion vector precision.

In an embodiment, the disclosure includes an encoder comprising a control point means for determining control points to encode an affine block from a video signal according to affine inter-prediction. The encoder further comprises a sub-block size means for determining a sub-block size of the sub-block. The encoder further comprises a motion vector means for determining a motion vector for a sub-block of the affine block based on the control points. The encoder further comprises a filter selection means for selecting an interpolation filter for application to a reference block corresponding to the sub-block, the interpolation filter selected based on the sub-block size. The encoder further comprises a reference determination means for determining that a motion vector for a current sample points to a fractional position at the reference block, the motion vector for the current sample offset from the motion vector for the sub-block, and applying the interpolation filter to the reference block to determine a reference sample at the fractional position. The encoder further comprises a residual means for determining residual information for the sub-block based on a difference between the current sample of the sub-block and the reference sample at the reference block. The encoder further comprises an encoding means for encoding the control points and the residual information in a bitstream. The encoder further comprises a transmitting means for transmitting the bitstream toward a decoder to support reconstruction of the affine block as part of a video frame. The disclosed embodiment includes selecting an interpolation filter based on sub-block size rather than trying to apply a single interpolation filter to all sub-blocks. For example, less complicated filters are selected for sub-blocks that are smaller than a threshold and more complicated and powerful interpolation filters are employed for sub-blocks that are larger than a threshold. This allows less complex filters to be employed when the movement between frames matches well and little conflicting data exists and allows more complex filters to be employed when the motion is more complex.

Optionally, in any of the preceding aspects, another implementation of the aspect provides, wherein the encoder is further configured to perform the method of any of the abovementioned aspects.

In an embodiment, the disclosure includes a method implemented in a decoder. The method comprises receiving, by a receiver of the decoder, a bitstream including control points describing an affine block coded according to affine inter-prediction. The method further comprises determining, by the processor, a sub-block size of the sub-block. The method further comprises determining, by the processor, a motion vector for a sub-block of the affine block based on the control points. The method further comprises selecting, by the processor, an interpolation filter for application to a reference block corresponding to the sub-block, the interpolation filter selected based on the sub-block size. The method further comprises determining, by the processor, that a motion vector for a current sample points to a fractional position at the reference block, the motion vector for the current sample offset from the motion vector for the sub-block. The method further comprises applying, by the processor, the interpolation filter to the reference block to determine a reference sample at the fractional position. The method further comprises determining, by the processor, prediction information based on the reference sample. The method further comprises reconstructing, by the processor, the affine block based on the prediction information and based on residual information for the affine block included in the bitstream. The method further comprises forwarding, by the processor, the reconstructed affine block toward a display as part of a reconstructed video sequence. The disclosed embodiment includes selecting an interpolation filter based on sub-block size rather than trying to apply a single interpolation filter to all sub-blocks. For example, less complicated filters are selected for sub-blocks that are smaller than a threshold and more complicated and powerful interpolation filters are employed for sub-blocks that are larger than a threshold. This allows less complex filters to be employed when the movement between frames matches well and little conflicting data exists and allows more complex filters to be employed when the motion is more complex.

Optionally, in any of the preceding aspects, another implementation of the aspect provides, wherein the interpolation filter is selected to include a first number of taps when the sub-block size is greater than a threshold and is selected to include a second number of taps when the sub-block size is less than or equal to the threshold, and wherein the first number of taps is larger than the second number of taps. Complexity of an interpolation filter can be measured in terms of a number of taps (e.g., coefficients and/or terms) used in the filter. In this embodiment, more complex filters with more taps are employed for larger sub-blocks and less complex filters with fewer taps are employed for smaller sub-blocks.

Optionally, in any of the preceding aspects, another implementation of the aspect provides, wherein the interpolation filter is selected as a DCT-IF with six taps, eight taps, or twelve taps when the sub-block size is greater than the threshold.

Optionally, in any of the preceding aspects, another implementation of the aspect provides, wherein the interpolation filter is selected as a DCT-IF with four taps or six taps when the sub-block size is less than or equal to the threshold.

Optionally, in any of the preceding aspects, another implementation of the aspect provides, wherein the interpolation filter is selected as a WIF with five taps when the sub-block size is less than or equal to the threshold.

Optionally, in any of the preceding aspects, another implementation of the aspect provides, wherein the sub-block size is determined based on a motion vector difference between the control points for the affine block, a width of the affine block, and a height of the affine block.

Optionally, in any of the preceding aspects, another implementation of the aspect provides, wherein the sub-block size is determined from a three dimensional lookup table indexed by a motion vector difference between control points for the affine block, a size of the affine block, and a motion vector precision.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the abovementioned aspects.

In an embodiment, the disclosure includes a video coding device comprising a receiver configured to receive a bitstream including control points describing an affine block coded according to affine inter-prediction. The video coding device further comprises a processor coupled to the receiver and configured to determine a sub-block size of the sub-block. The processor is further configured to determine a motion vector for a sub-block of the affine block based on the control points. The processor is further configured to select an interpolation filter for application to a reference block corresponding to the sub-block, the interpolation filter selected based on the sub-block size. The processor is further configured to determine that a motion vector for a current sample points to a fractional position at the reference block, the motion vector for the current sample offset from the motion vector for the sub-block. The processor is further configured to apply the interpolation filter to the reference block to determine a reference sample at the fractional position. The processor is further configured to determine prediction information based on the reference sample. The processor is further configured to reconstruct the affine block based on the prediction information and based on residual information for the affine block included in the bitstream. The processor is further configured to forward the reconstructed affine block toward a display as part of a reconstructed video sequence. The disclosed embodiment includes selecting an interpolation filter based on sub-block size rather than trying to apply a single interpolation filter to all sub-blocks. For example, less complicated filters are selected for sub-blocks that are smaller than a threshold and more complicated and powerful interpolation filters are employed for sub-blocks that are larger than a threshold. This allows less complex filters to be employed when the movement between frames matches well and little conflicting data exists and allows more complex filters to be employed when the motion is more complex.

Optionally, in any of the preceding aspects, another implementation of the aspect provides, wherein the interpolation filter is selected to include a first number of taps when the sub-block size is greater than a threshold and is selected to include a second number of taps when the sub-block size is less than or equal to the threshold, and wherein the first number of taps is larger than the second number of taps. Complexity of an interpolation filter can be measured in terms of a number of taps (e.g., coefficients and/or terms) used in the filter. In this embodiment, more complex filters with more taps are employed for larger sub-blocks and less complex filters with fewer taps are employed for smaller sub-blocks.

Optionally, in any of the preceding aspects, another implementation of the aspect provides, wherein the interpolation filter is selected as a DCT-IF with six taps, eight taps, or twelve taps when the sub-block size is greater than the threshold.

Optionally, in any of the preceding aspects, another implementation of the aspect provides, wherein the interpolation filter is selected as a DCT-IF with four taps or six taps when the sub-block size is less than or equal to the threshold.

Optionally, in any of the preceding aspects, another implementation of the aspect provides, wherein the interpolation filter is selected as a WIF with five taps when the sub-block size is less than or equal to the threshold.

Optionally, in any of the preceding aspects, another implementation of the aspect provides, wherein the sub-block size is determined based on a motion vector difference between the control points for the affine block, a width of the affine block, and a height of the affine block.

Optionally, in any of the preceding aspects, another implementation of the aspect provides, wherein the sub-block size is determined from a three dimensional lookup table indexed by a motion vector difference between control points for the affine block, a size of the affine block, and a motion vector precision.

In an embodiment, the disclosure includes a decoder comprising a receiving means for receiving a bitstream including control points describing an affine block coded according to affine inter-prediction. The decoder further comprises a motion vector means for determining a motion vector for a sub-block of the affine block based on the control points. The decoder further comprises a sub-block size means for determining a sub-block size of the sub-block. The decoder further comprises a filter selection means for selecting an interpolation filter for application to a reference block corresponding to the sub-block, the interpolation filter selected based on the sub-block size. The decoder further comprises a reference determination means for determining that a motion vector for a current sample points to a fractional position at the reference block, the motion vector for the current sample offset from the motion vector for the sub-block, and applying the interpolation filter to the reference block to determine a reference sample at the fractional position. The decoder further comprises a prediction means for determining prediction information based on the reference sample. The decoder further comprises a reconstructing means for reconstructing the affine block based on the prediction information and based on residual information for the affine block included in the bitstream. The decoder further comprises a forwarding means for forwarding the reconstructed affine block toward a display as part of a reconstructed video sequence. The disclosed embodiment includes selecting an interpolation filter based on sub-block size rather than trying to apply a single interpolation filter to all sub-blocks. For example, less complicated filters are selected for sub-blocks that are smaller than a threshold and more complicated and powerful interpolation filters are employed for sub-blocks that are larger than a threshold. This allows less complex filters to be employed when the movement between frames matches well and little conflicting data exists and allows more complex filters to be employed when the motion is more complex.

Optionally, in any of the preceding aspects, another implementation of the aspect provides, wherein the encoder is further configured to perform the method of any of the abovementioned aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
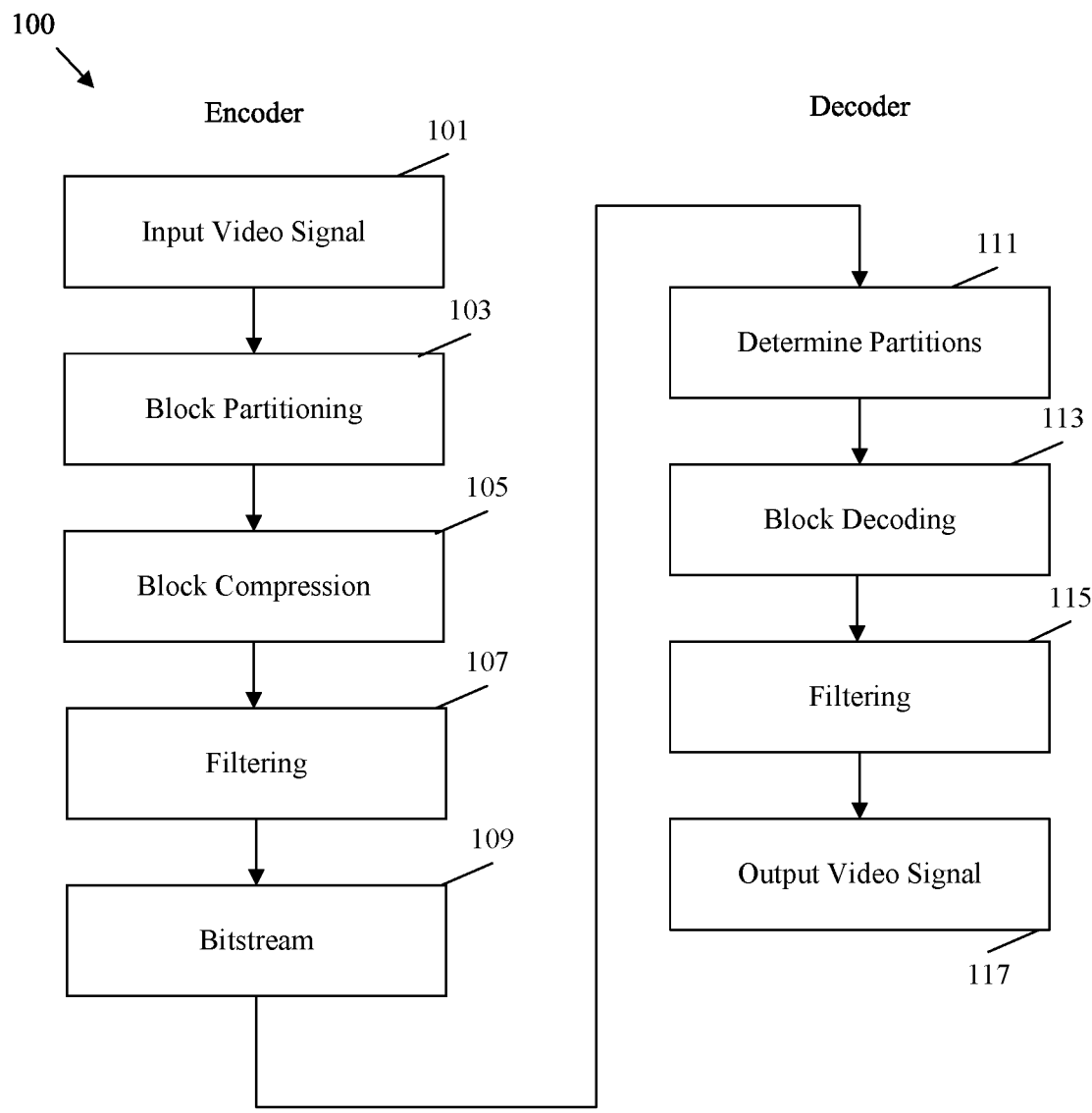
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding involves a combination of compression by inter-prediction and intra-prediction. The present disclosure focuses on modifying interpolation mechanisms related to inter-prediction in order to reduce computational complexity and/or memory usage while increasing accuracy and/or coding efficiency. Inter-prediction is a mechanism to encode the position of an object in a frame based on the position of the object in a different frame. For example, a motion vector can indicate a direction of movement of an object over time as depicted over multiple frames of a sequence of video. Hence, an object in a reference frame and a motion vector can be encoded and then employed by a decoder to partially reconstruct a frame that is temporally adjacent to the reference frame. Inter-prediction can employ unidirectional inter-prediction and/or bidirectional inter-prediction. Unidirectional inter-prediction uses a single motion vector to a single reference frame to predict the location of an object in a current frame. Bidirectional inter-prediction uses a preceding motion vector pointing towards a preceding reference frame and a subsequent motion vector pointing towards a subsequent reference frame.

Affine inter-prediction is a type of inter-prediction that is applied when an object visually changes shape between frames. This type of motion may be referred to as non-translational motion. Specifically, non-translational motion is movement that is not uniform. For example, camera zooming in and/or out, rotations, perspective motion, and/or other irregular motion may cause an object to appear to change shape between frames. Affine inter-prediction distorts a reference frame so that the motion vectors for an object in the current frame point in the correct directions for the various sub-portions of the object at the reference frame. An affine transformation may preserve points, straight lines, planes, and/or parallel relationships between lines, while distorting angles between lines and distances between points. Affine inter-prediction for a current block, which may also be referred to as an affine block in the affine context, may involve selecting a motion model to describe the motion of an object between the affine block and a reference block. Rather than determining a motion vector for every sample of the affine block, the affine block is sub-divided into sub-blocks. A motion vector is selected for each sub-block based on the motion model. To determine a reference sample for a sub-block sample, for either encoding or decoding purposes, the motion vector for the sub-block is modified by an offset associated with the corresponding sub-block sample. The offset motion vector then points from the sub-block sample to the reference sample.

Motion vectors may be configured to have sub-pel accuracy. A pel is a position of a pixel, which can also be referred to as a sample. Pixels/samples are positioned at integer positions for coding purposes. In some cases, motion vectors with sub-pel accuracy may point from the position of the sub-block sample to a fractional position at the reference block. A fractional position is a position between the integer positions that contain the corresponding samples. As such, a motion vector pointing from an affine sub-block sample to a fractional position at the reference block may not clearly designate a corresponding reference sample. Interpolation filters can be employed to address this ambiguity by upsampling at the fractional position. For example, an interpolation filter can be applied to the reference block to create a reference sample at the indicated fractional position based on the values of reference samples adjacent to the fractional position. The application of interpolation filters can employ significant processing and/or memory resources. For example, complicated interpolation filters use more memory and processing resources, but provide greater accuracy than simpler interpolation filters. Accordingly, selection of an interpolation filter results in a tradeoff between hardware resource usage and accuracy, and hence coding efficiency and image clarity of a reconstructed image.

Disclosed herein are mechanisms for an adaptive interpolation filter that uses less complex computations, and hence fewer resources, for cases where interpolation is likely to be simple and more complex computations for increased accuracy in other cases. Specifically, affine blocks may be divided into sub-blocks of various sizes. Smaller sub-blocks generally contain more homogenous samples and/or more accurately match motion changes than do larger sub-blocks. Accordingly, the adaptive interpolation filter applies more complex filters for sub-blocks with sizes in excess of a threshold and applies less complex filters for sub-blocks with sizes equal to or less than the threshold (e.g., where the threshold is a height or width of four or eight pixels). Interpolation filters may operate in the frequency domain, and may describe a group of pixel values in terms of a signal that changes over the sub-block. The signal may be described in terms of signal coefficients. Filters that employ more coefficients, also known as taps, are more complicated but more accurately describe the signal. Hence, the adaptive interpolation filter can apply filters with more taps when the sub-block's size is larger than the threshold and apply filters with fewer taps when the sub-block's size is equal to or smaller than the threshold. For example, the adaptive interpolation filter can select a discrete cosine transform interpolation filter (DCT-IF) with six taps, eight taps, or twelve taps for sub-blocks that are larger than a threshold. Further, the adaptive interpolation filter can select a DCT-IF with four taps or six taps for sub-blocks that are equal to or smaller than a threshold. As another example, the adaptive interpolation filter can select a warping interpolation filter (WIF) with five taps when the sub-block size is less than or equal to the threshold.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame. Any differences between the current image block and the reference block are stored in residual blocks. Transforms may be applied to the residual blocks to further compress the file.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

The present disclosure relates to modifications to decrease the computational complexity of affine inter-prediction. Specifically, the present disclosure introduces a mechanism to select an interpolation filter for use in inter-prediction. More complex interpolation filters are employed when more accuracy is beneficial and less complex interpolation filters are employed when less accuracy is needed. This reduces the average complexity of block compression at the encoder and at the decoder as well as increases accuracy in some cases resulting in reduced residual and hence increased average coding efficiency. Hence, the inter-prediction mechanisms described in the FIGS. below impact the operation of block compression at step 105, bitstream encoding and transmission at step 109, and block decoding at step 113.

Figure 2:
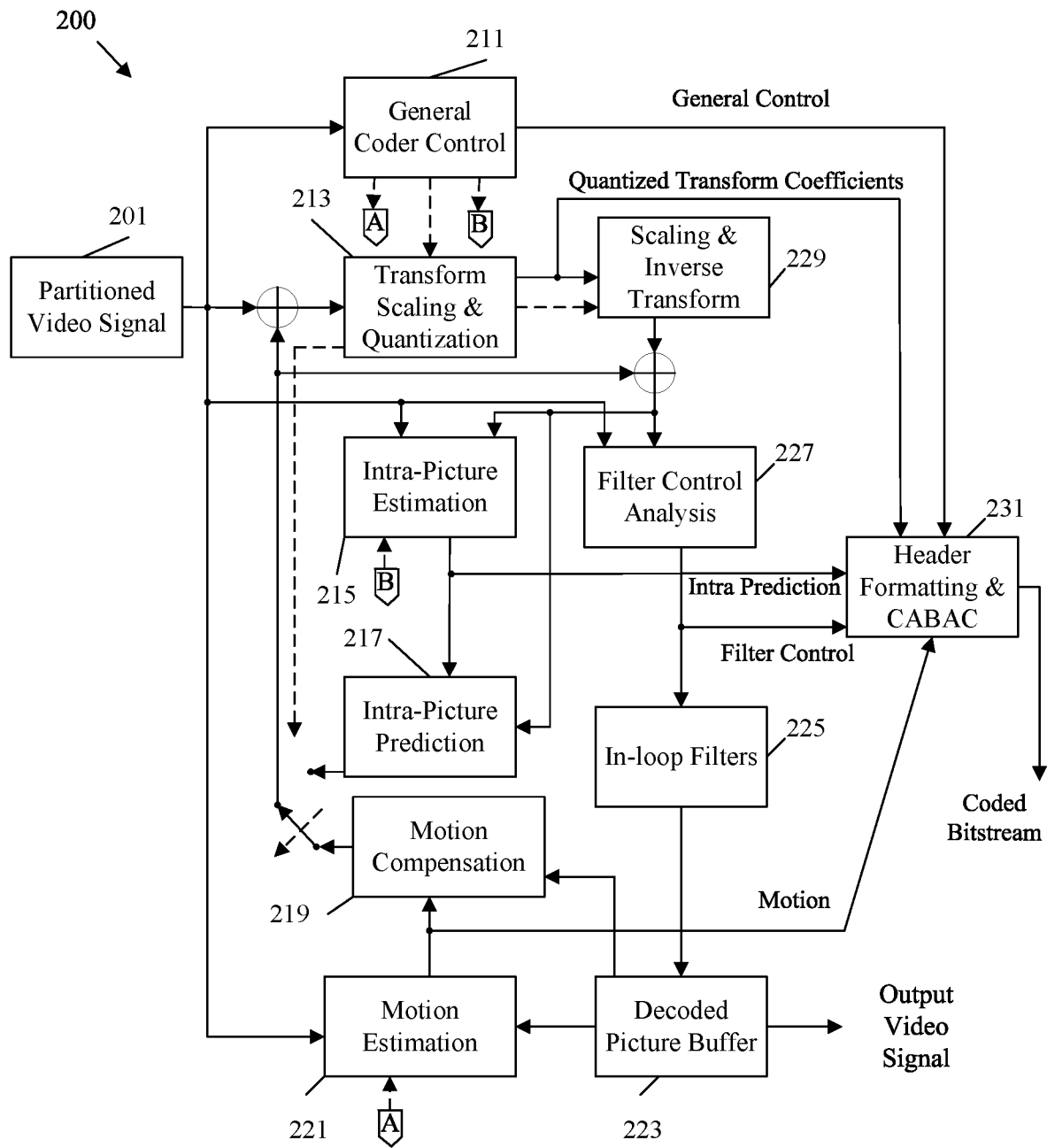
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a coding tree unit (CTU), coding tree blocks (CTBs), and CUs. For example, a CTU can be divided into CTBs, which can then be divided into CUs, which can be further sub-divided as desired. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC). CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

The present disclosure relates to modifications to decrease the computational complexity of affine inter-prediction. Specifically, the present disclosure introduces a mechanism to select an interpolation filter for use in inter-prediction. More complex interpolation filters are employed when more accuracy is beneficial and less complex interpolation filters are employed when less accuracy is needed. This reduces the average complexity of block compression at the encoder and at the decoder as well increases accuracy in some cases resulting in reduced residual and hence increased average coding efficiency. Hence, the inter-prediction mechanisms described in the FIGS. below impact the operation of motion estimation component 221, motion compensation component 219, and/or header formatting and CABAC component 231.

Figure 3:
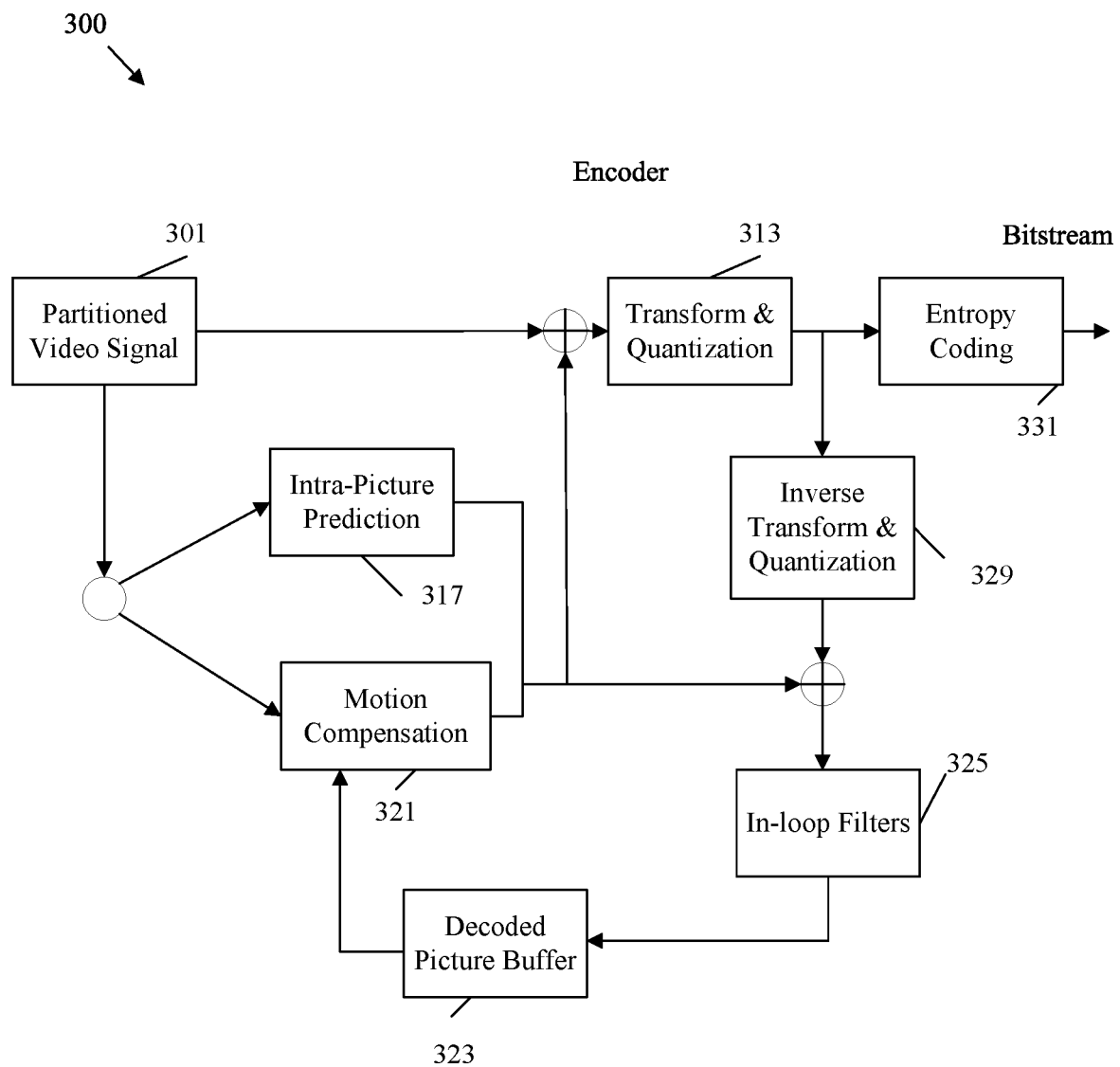
FIG. 3 is a schematic diagram illustrating an example video encoder that may employ an adaptive interpolation filter.

FIG. 3 is a block diagram illustrating an example video encoder 300 that may employ an adaptive interpolation filter. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

The following is a more detailed explanation of affine inter-prediction as applied by encoder 300 by employing the functionality described with respect to method 100 and codec system 200. Affine inter-prediction is a particular type of inter-prediction employed in encoding and decoding by step 105, step 113, motion compensation component 219, motion estimation component 221, and/or motion compensation component 321. Inter-prediction employs a motion vector and a reference block in a reference frame to encode blocks for one or more frames that are temporally adjacent to the reference frame. As discussed above, this allows an object to be coded with respect to the reference frame without recoding the object repeatedly for every frame. Affine inter-prediction is employed when an object visually changes shape between frames, which may occur due to camera zoom, camera rotations, perspective motion, and/or other irregular motion. When employing affine inter-prediction, the motion compensation component 321 distorts the reference frame in order to project the shape and location of the object in temporally adjacent frames.

As the reference frame is distorted by the affine inter-prediction process, the corresponding motion vectors vary across a block being encoded. The motion vectors for a current block can be described in terms of a motion model based on control point motion vectors for the current block. The current block is subdivided into sub-blocks of sizes selected based on the motion model and then the motion vectors for the sub-blocks can be determined based on the motion model and/or control points. The resulting motion vectors for the sub-blocks can be filtered and weighted by the motion compensation component 321 and/or the in-loop filters component 325 to generate prediction information (e.g., PUs) and residual information, which can be transformed and/or encoded by the transform and quantization component 313 and the entropy coding component 331, respectively.

For example, the motion compensation component 321 may first determine control point vectors for a current block as part of a rate distortion optimization process. The motion vectors may be inherited from neighboring coded blocks based on a predetermined priority. The motion compensation component 321 may also determine the motion model based on the control point vectors. The motion model describes the motion of the block between the current frame and the reference frame(s). The motion compensation component 321 may then determine the size of the various sub-blocks based on the motion model and/or control points. The motion compensation component 321 may also determine the relevant motion vector for each sub-block. While a single motion vector can be used for each sub-block, motion vectors for each sample (e.g., pixel) can be determined based on the motion vector for the sub-block and an offset. The motion compensation component 321 may employ such a process as part of both a unidirectional inter-prediction and a bidirectional inter-prediction. For example, the motion compensation component 321 may attempt both unidirectional inter-prediction and bidirectional inter-prediction during rate distortion optimization and then select the approach that results in the best balance of coding size and video quality. In unidirectional prediction, a current block is predicted by a single reference frame, while in bidirectional prediction a current block is predicted by a temporally preceding reference frame and a temporally subsequent reference frame.

At the encoder 300, the motion vector for each sub-block is used to compare sub-block samples to corresponding samples in the reference block pointed to by the motion vector. The comparison is used to generate the residual block for use in decoding. For example, the motion compensation component 321 can position at the motion vector for the sub-block at a predefined position, such as at the center of the sub-block. The motion compensation component 321 can also determine an offset between the predefined position and a current sample. The motion compensation component 321 can then apply the offset to the motion vector for the sub-block to determine the value of the motion vector at the position for the current sample. Motion vectors may have a sub-pel accuracy, where a pel is a pixel position. As such, a motion vector computed at a sample position may point to a position between pixels at the reference block. This issue can be addressed by employing an interpolation filter. An interpolation filter determines an effective reference sample value a location pointed to by the motion vector based on the values of surrounding reference samples.

Interpolation filters vary in complexity. Interpolation filters of greater complexity consider more characteristics of the surrounding samples, and hence determine a more accurate effective reference sample. However, more complex interpolation filters also use more processing resources. Smaller sub-blocks generally contain more homogenous samples and/or more accurately match motion changes than do larger sub-blocks. Accordingly, the motion compensation component 321 employs an adaptive interpolation filter that applies more complex filters for sub-blocks with sizes in excess of a threshold and applies less complex filters for sub-blocks with sizes equal to or less than the threshold. This increases the accuracy, and hence coding efficiency, for larger sub-blocks when such accuracy is beneficial. This also reduces the processing complexity for smaller sub-blocks that do not significantly benefit from the more complex interpolation filters. One measure of interpolation filters is the number of coefficients, sometimes referred to as taps, used in the filter. Accordingly, the motion compensation component 321 can employ interpolation filters with fewer taps for smaller sub-blocks and interpolation filters with more taps for larger sub-blocks. These aspects are discussed in greater detail with respect to the FIGS. below.

Figure 4:
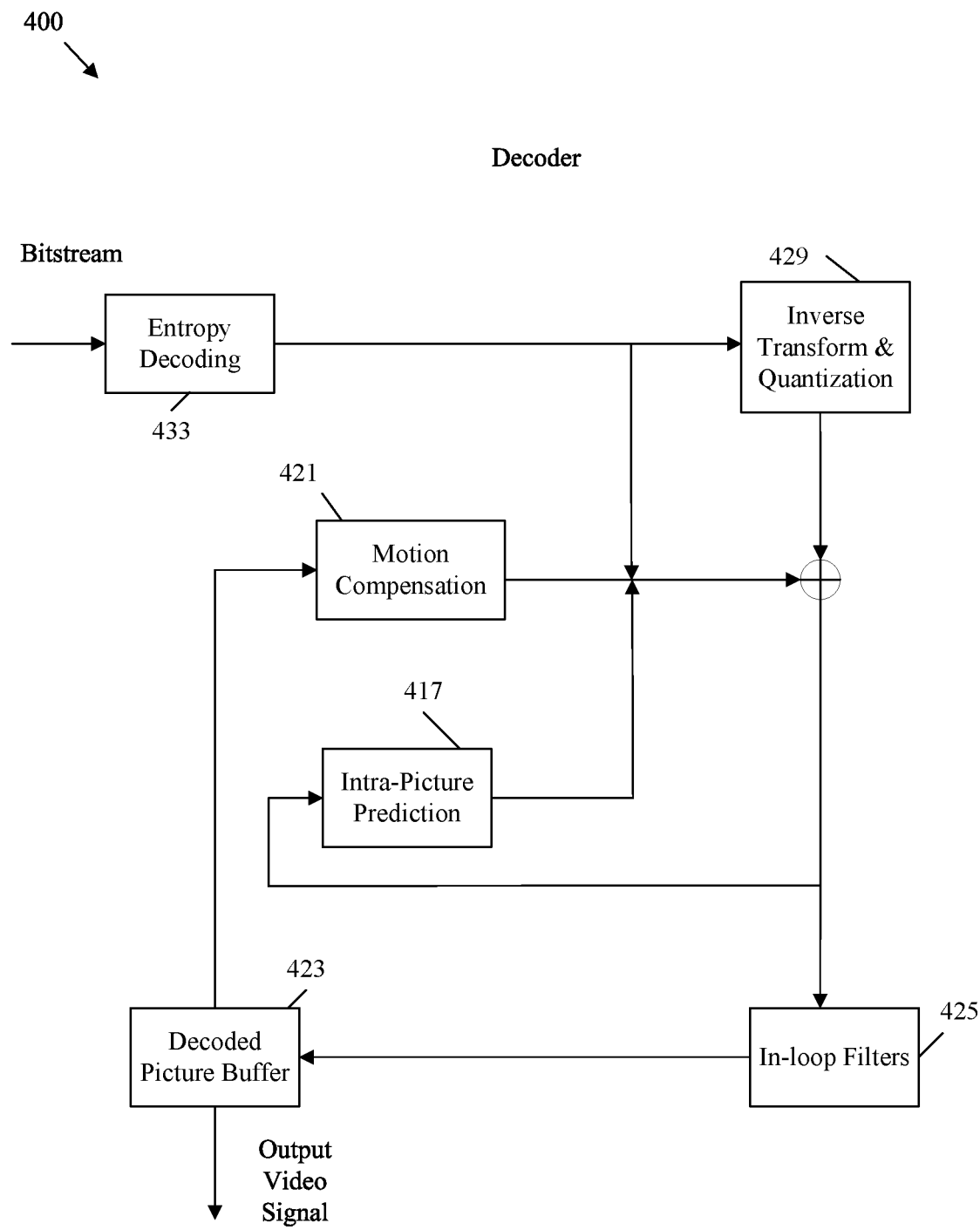
FIG. 4 is a schematic diagram illustrating an example video decoder that may employ an adaptive interpolation filter.

FIG. 4 is a block diagram illustrating an example video decoder 400 that may employ an adaptive interpolation filter. Video decoder 400 may be employed to implement the decoding functions of codec system 200 and/or implement steps 111, 113, 115, and/or 117 of method 100. Decoder 400) receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

The following is a more detailed explanation of affine inter-prediction as applied by decoder 400 by employing the functionality described with respect to method 100 and codec system 200. Affine inter-prediction is applied by motion compensation component 421 as part of performing inter-prediction. For example, the motion compensation component 421 is configured to employ the prediction information in the bitstream to reconstruct current blocks. Such prediction information may include a candidate index that indicates the motion model and/or the control points for a current block encoded according to affine inter-prediction, sometimes referred to herein as an affine block. The motion compensation component 421 can employ the control points and/or motion model to determine a motion vector for the affine block. The motion compensation component 421 can also employ the motion model and/or control points to determine sizes for sub-blocks of the affine block. The motion compensation component 421 can then determine reference samples for each sample of each sub-block by positioning the motion vector at a predetermined position, applying an offset to determine the motion vector at the corresponding sample position, and obtaining the reference sample pointed to by the motion vector. The decoder 400 can then employ the residual block from the inverse transform and quantization component 429 and the reference samples from the motion compensation component 421 to reconstruct the affine block as a block of pixels that mirrors the block compressed at the encoder 300.

As with encoder 300, the motion compensation component 421 of decoder 400 may generate motion vectors for a sample the points to a non-integer position at a reference frame. This may occur due to application of a motion vector with a sub-pel to an offset. Accordingly, the motion compensation component 421 employs an interpolation filter to determine the effective reference sample pointed to by the motion vector. As with motion compensation component 321, the motion compensation component 421 can employ less complex interpolation filters for sub-blocks with a size below or equal to a threshold and more complex interpolation filters for sub-blocks with a size in excess of the threshold. This increases the accuracy, and hence coding efficiency, for larger sub-blocks when such accuracy is beneficial. This also reduces the processing complexity for smaller sub-blocks that do not significantly benefit from the more complex interpolation filters. Accordingly, the motion compensation component 421 can employ interpolation filters with fewer taps for smaller sub-blocks and interpolation filters with more taps for larger sub-blocks. These aspects are discussed in greater detail with respect to the FIGS. below.

Figure 5:
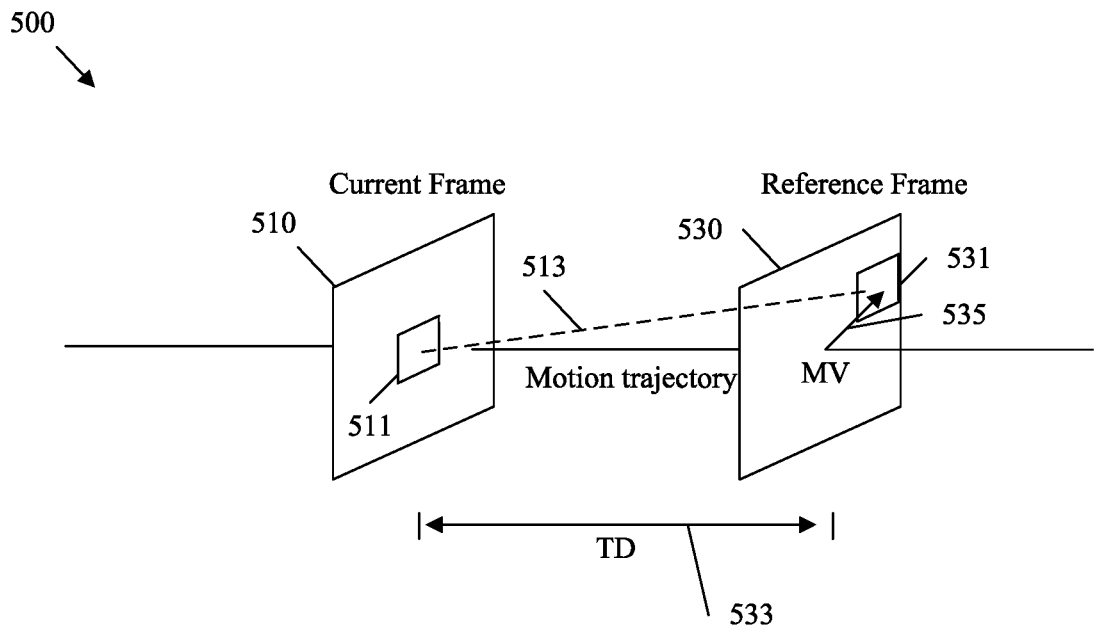
FIG. 5 is a schematic diagram illustrating an example of unidirectional inter-prediction.

FIG. 5 is a schematic diagram illustrating an example of unidirectional inter-prediction 500, for example as performed to determine motion vectors (MVs) at block compression step 105, block decoding step 113, motion estimation component 221, motion compensation component 219, motion compensation component 321, and/or motion compensation component 421. For example, unidirectional inter-prediction 500 can be employed to determine motion vectors for a block in inter-prediction modes and/or to determine motion vectors for sub-blocks in affine inter-prediction mode.

Unidirectional inter-prediction 500 employs a reference frame 530 with a reference block 531 to predict a current block 511 in a current frame 510. The reference frame 530 may be temporally positioned after the current frame 510 as shown (e.g., as a subsequent reference frame), but may also be temporally positioned before the current frame 510 (e.g., as a preceding reference frame) in some examples. The current frame 510 is an example frame/picture being encoded/decoded at a particular time. The current frame 510) contains an object in the current block 511 that matches an object in the reference block 531 of the reference frame 530. The reference frame 530) is a frame that is employed as a reference for encoding a current frame 510, and a reference block 531 is a block in the reference frame 530) that contains an object also contained in the current block 511 of the current frame 510.

The current block 511 is any coding unit that is being encoded/decoded at a specified point in the coding process. The current block 511 may be an entire partitioned block, or may be a sub-block in the affine inter-prediction case. The current frame 510 is separated from the reference frame 530) by some temporal distance (TD) 533. The TD 533 indicates an amount of time between the current frame 510) and the reference frame 530) in a video sequence, and may be measured in units of frames. The prediction information for the current block 511 may reference the reference frame 530) and/or reference block 531 by a reference index indicating the direction and temporal distance between the frames. Over the time period represented by the TD 533, the object in the current block 511 moves from a position in the current frame 510 to another position in the reference frame 530 (e.g., the position of the reference block 531). For example, the object may move along a motion trajectory 513, which is a direction of movement of an object over time. A motion vector 535 describes the direction and magnitude of the movement of the object along the motion trajectory 513 over the TD 533. Accordingly, an encoded motion vector 535 and a reference block 531 provides information sufficient to reconstruct a current block 511 and position the current block 511 in the current frame 510. In the affine inter-prediction case, the object changes shape between the current frame 510) and the reference frame 530. Hence, the current block 511 is sub-divided into sub-blocks that each include a corresponding motion vector 535, for example as defined by a motion model and/or control points.

Figure 6:
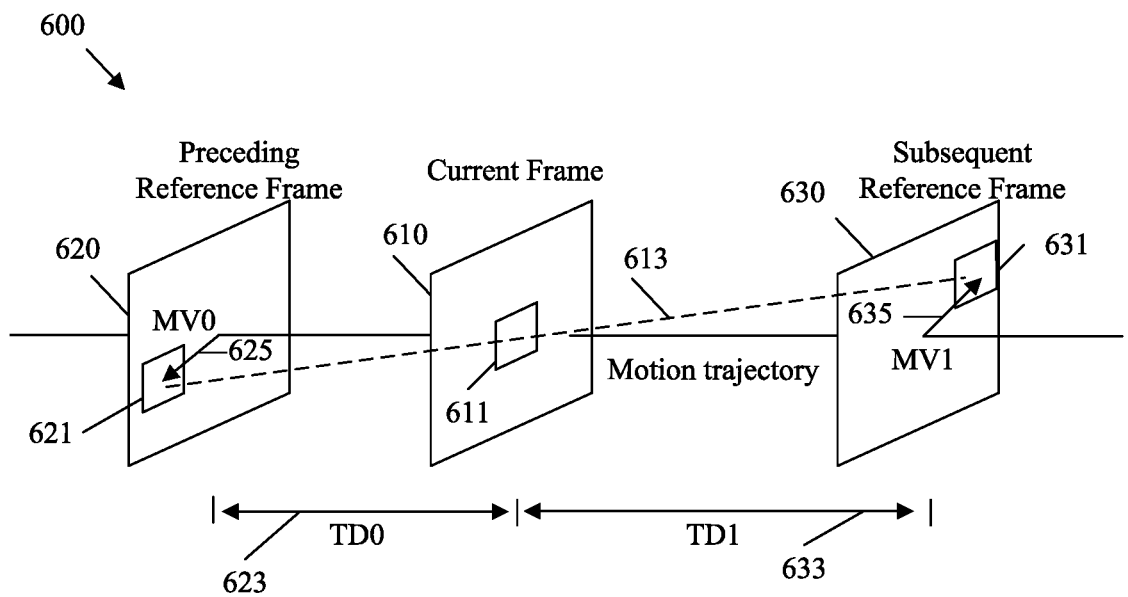
FIG. 6 is a schematic diagram illustrating an example of bidirectional inter-prediction.

FIG. 6 is a schematic diagram illustrating an example of bidirectional inter-prediction 600, for example as performed to determine MVs at block compression step 105, block decoding step 113, motion estimation component 221, motion compensation component 219, motion compensation component 321, and/or motion compensation component 421. For example, bidirectional inter-prediction 600 can be employed to determine motion vectors for a block in inter-prediction modes and/or to determine motion vectors for sub-blocks in affine inter-prediction mode.

Bidirectional inter-prediction 600 is similar to unidirectional inter-prediction 500, but employs a pair of reference frames to predict a current block 611 in a current frame 610. Hence current frame 610) and current block 611 are substantially similar to current frame 510 and current block 511, respectively. The current frame 610 is temporally positioned between a preceding reference frame 620, which occurs before the current frame 610 in the video sequence, and a subsequent reference frame 630, which occurs after the current frame 610 in the video sequence. Preceding reference frame 620 and subsequent reference frame 630 are otherwise substantially similar to reference frame 530.

The current block 611 is matched to a preceding reference block 621 in the preceding reference frame 620 and to a subsequent reference block 631 in the subsequent reference frame 630. Such a match indicates that, over the course of the video sequence, an object moves from a position at the preceding reference block 621 to a position at the subsequent reference block 631 along a motion trajectory 613 and via the current block 611. The current frame 610 is separated from the preceding reference frame 620 by some preceding temporal distance (TD0) 623 and separated from the subsequent reference frame 630 by some subsequent temporal distance (TD1) 633. The TD0 623 indicates an amount of time between the preceding reference frame 620 and the current frame 610 in the video sequence in units of frames. The TD1 633 indicates an amount of time between the current frame 610 and the subsequent reference frame 630 in the video sequence in units of frame. Hence, the object moves from the preceding reference block 621 to the current block 611 along the motion trajectory 613 over a time period indicated by TD0 623. The object also moves from the current block 611 to the subsequent reference block 631 along the motion trajectory 613 over a time period indicated by TD1 633. The prediction information for the current block 611 may reference the preceding reference frame 620 and/or preceding reference block 621 and the subsequent reference frame 630 and/or subsequent reference block 631 by a pair of reference indices indicating the direction and temporal distance between the frames.

A preceding motion vector (MV0) 625 describes the direction and magnitude of the movement of the object along the motion trajectory 613 over the TD0 623 (e.g., between the preceding reference frame 620 and the current frame 610). A subsequent motion vector (MV1) 635 describes the direction and magnitude of the movement of the object along the motion trajectory 613 over the TD1 633 (e.g., between the current frame 610 and the subsequent reference frame 630). As such, in bidirectional inter-prediction 600, the current block 611 can be coded and reconstructed by employing the preceding reference block 621 and/or the subsequent reference block 631. MV0 625, and MV1 635.

A motion model for an affine block may employ unidirectional inter-prediction 500 and/or bidirectional inter-prediction 600. The direction and type of inter-prediction may depend on a reference index of the relevant motion vector. For example, the type of inter-prediction employed for a motion model may depend on the control point motion vector(s), which may be determined based on neighbor coded blocks.

Figure 7:
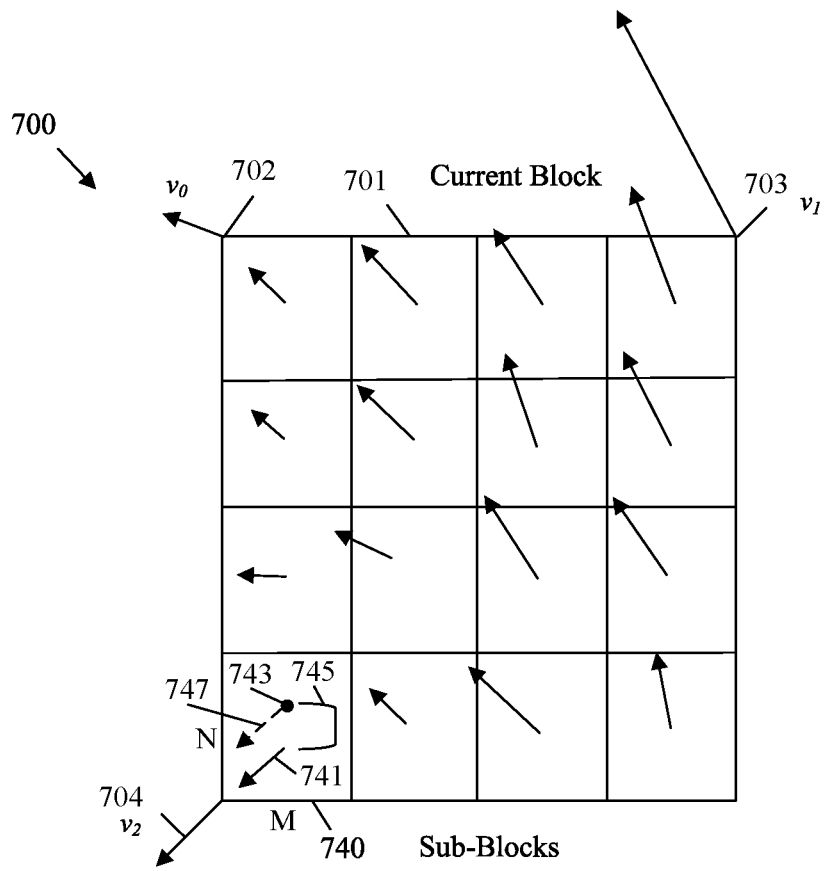
FIG. 7 is a schematic diagram illustrating an example of an affine motion model for affine inter-prediction.

FIG. 7 is a schematic diagram illustrating an example of an affine motion model 700 for affine inter-prediction. Affine motion model 700 may be used for both unidirectional inter-prediction 500 and bidirectional inter-prediction 600. Hence, affine motion model 700 can be applied to determine motion vectors at block compression step 105, block decoding step 113, motion estimation component 221, motion compensation component 219, motion compensation component 321, and/or motion compensation component 421.

As noted above, affine inter-prediction distorts the reference frame(s) so that a current block 701 can be predicted despite certain shape changes while the corresponding object moves between the corresponding frames. Accordingly, the motion vectors for a current block 701 vary across the current block 701. The motion vectors for the current block 701 are described in terms of control points including motion vectors. In the example depicted, three control point motion vectors v0 702, v1 703, and v2 704 are shown. However, the motion of the current block 701 could be modeled with other numbers of control points. The control point motion vector v0 702 is positioned at the top left corner of the current block 701, the control point motion vector v1 703 is positioned at the top right corner of the current block 701, and the control point motion vector v2 704 is positioned at the bottom left corner of the current block 701. Motion vector v0 702 and motion vector v1 703 contain horizontal (x) components and vertical (y) components that indicate the magnitude of the vectors. Hence, motion vector v0 702 can be described as (v0x, v0y), motion vector v1 703 can be described as (v1x, v1y), and motion vector v2 704 can be described as (v2x, v2y) respectively. Motion vector v0 702, motion vector v1 703, and motion vector v2 704 can be employed to determine a motion vector field for the entire current block 701. The motion vector field is a field of vectors that change based on position. One approach to determining motion vectors for the current block 701 is to calculate a motion vector for each sample, where a sample is a luma and/or chroma value at a pixel. Determining motion vectors for a current block 701 in motion is known as motion compensated prediction (MCP), and performing such compensation on a per sample basis is per sample MCP. For example, the control points can be employed in a motion model that can be used to calculate per sample motion vectors. An example, a four-parameter affine model can be represented as according to Equation Set 1 below:

$$\begin{cases} v_x = \frac{v_{1x} - v_{0x}}{w}x - \frac{v_{1y} - v_{0y}}{w}y + v_{0x} \\ v_y = \frac{v_{1y} - v_{0y}}{w}x + \frac{v_{1x} - v_{0x}}{w}y + v_{0y} \end{cases} \quad \text{Equation Set 1}$$

where (v0x, v0y) is the motion vector v0 702 with the coordinate (0, 0), (v1x, v1y) is motion vector v1 703 with the coordinate (W, 0), and W is the width of current block 701.

However, per sample MCP is computationally intensive and employs significant processing resources. Another approach is to split the current block 701 into sub-blocks 740 and then calculate a motion vector 741 for each sub-block 740. This version of MCP is less computationally intensive than per sample MCP. When performing sub-block based MCP, the size of the sub-blocks 740 is determined. Then a motion vector 741 for each sub-block 740 is determined at a predetermined position in the sub-block 740 based on the control points. The motion vector 747 for each sample 743 in a sub-block 740 can then be determined based on the sub-block 740 motion vector 741 when determining the corresponding residual samples at the encoder or reconstructing the block at the decoder.

As an example, the sub-block 740 size can be described in terms of sub-block height (N) and sub-block width (M). The sub-block 740 size can be calculated according to Equation Set 2 below:

$$M = \frac{w \times MvPre}{\max(\text{abs}(v_{1x} - v_{0x}), \text{abs}(v_{1y} - v_{0y}))} \quad \text{Equation Set 2}$$

$$N = \frac{h \times MvPre}{\max(\text{abs}(v_{2x} - v_{0x}), \text{abs}(v_{2y} - v_{0y}))}$$

where (v0x, v0y) is the motion vector v0 702 with the coordinate (0, 0), (v1x, v1y) is motion vector v1 703 with the coordinate (w, 0), (v2x, v2y) is motion vector v2 704 with the coordinate (h, 0), w is the width of current block 701, h is the height of the current block 701, MvPre is the precision of the motion vectors employed in the motion model describing the current block 701, max is a maximum function that returns the largest value of comma separated values, and abs is an absolute value function.

Once the sub-block 740 size (e.g., M and N) is determined, a motion vector 741 for the sub-block 740) can be determined based on the control points. A motion vector 741 for a sub-block 740 can be determined according to one of many different motion models. For example, the motion vector 741 for a sub-block 740) can be determined as an average of the control point motion vectors v0 702, v1 703, and v2 704 that is weighted based on a distance between a predefined position of the motion vector 741 and the position of the corresponding control point motion vectors v0 702, v1 703, and v2 704. The motion vector 747 for a reference sample 743 can then be determined based on the motion vector 741 for the sub-block 740. For example, the reference sample 743 is separated from the origin of the sub-motion vector 741 of the sub-block 740 by an offset 745. Hence, the motion vector 747 can be computed as a change in motion vector 741 by accounting for the offset 745.

Figure 8:
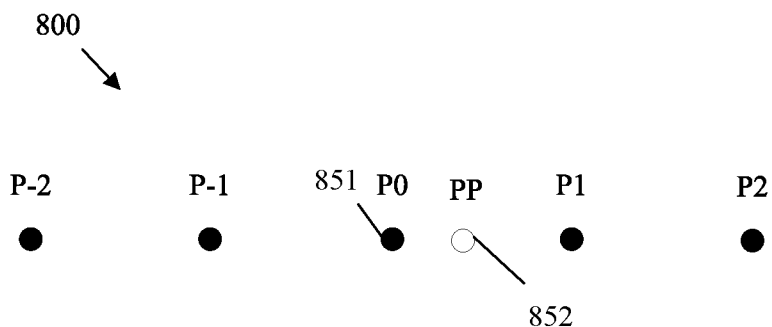
FIG. 8 is a schematic diagram illustrating an example fractional position at a reference block.

At an encoder, the motion vector 747 for a sample 743 can be employed to locate (e.g., point to) a reference sample in a reference block/frame. The sample 743 can then be compared to the reference sample to determine a residual sample, which can then be encoded in a bitstream. At a decoder, the motion vector 747 for a sample 743 can be employed to locate (e.g., point to) a reference sample in a reference block/frame. The reference sample can then be employed to reconstruct the sample 743 based on the residual sample encoded in the bitstream. When performing the abovementioned processes, sometimes the motion vector 747 calculated for the sample 743 does not point to an exact reference sample, as illustrated in FIG. 8 below. An interpolation filter can be employed to address this issue and determine the value a reference sample would have if the reference sample were located at the indicated positon.

FIG. 8 is a schematic diagram illustrating an example fractional position 852 at a reference block 800. Reference block 800 is a block containing reference samples 851 referred to by a current block (e.g., an affine block), such as current block 701. For example, reference block 800 may be referred to in unidirectional inter-prediction 500 and/or bidirectional inter-prediction 600. Hence, reference block 800 can be employed during block compression step 105, block decoding step 113, motion estimation component 221, motion compensation component 219, motion compensation component 321, and/or motion compensation component 421.

As shown, a reference block 800 includes reference samples 851 at various integer positions, depicted in FIG. 8 as positions P-2, P-1, P0, P1, and P2. It should be noted that the reference samples 851 are shown as a line for simplicity of discussion. However, a reference block 800 contains multiple lines of reference samples 851, where each line is separated by an offset according to the height of the reference block. In any event, a motion vector can be determined for a sample based on the motion vector for a sub-block and an offset as discussed with respect to FIG. 7 above. As the motion vector for the sample may have a sub-pel precision, the computed motion vector for a sample may be computed to point to a fractional position 852, denoted as PP, between the integer positions associated with the reference samples 851. An interpolation filter can be employed to determine the value a reference sample 851 would have if located at the fractional position 852. An interpolation filter is a filter that employs the values of the reference samples 851 around the fractional position 852 to determine an effective reference sample 851 value at the fractional position 852. Many different interpolation filters can be employed for this purpose. Some filters are more complicated and employ more reference samples 851 and/or more characteristics of the reference samples 851 to determine the value at the fractional position. Other filters are less complicated and use fewer reference samples 851 and/or corresponding characteristics. The less complicated filters sacrifice accuracy for computational speed.

As noted above, smaller sub-blocks (e.g., sub-block 740)) contain more homogenous sample values and/or more closely match the motion of the reference blocks. Hence, less complicated interpolation filters can be selected for smaller sub-blocks, thereby decreasing processing resource usage without significantly reducing interpolation accuracy. For larger sub-blocks, more complicated interpolation filters can be employed in order to maintain accuracy for sub-blocks with more complicated characteristics.

One example interpolation filter is a DCT-IF with a number of taps that vary based on desired complexity. For example a DCT-IF can be designed with four taps, six taps, eight taps, ten taps, twelve taps, etc. based on Equation 3 below, which is a product of forward and inverse transform DCT formulas:

$$f_m(\alpha) = \frac{1}{M} \sum_{k=1}^{2M-1} \left( c_k^2 \cos\left(\frac{(2m-1+2M)\pi k}{4M}\right) \cos\left(\frac{(2\alpha-1+2M)\pi k}{4M}\right) \right) \quad \text{Equation 3}$$

where α is a fractional pel shift value (e.g., the shift for fractional position 852), fm is an interpolated value a fractional position 852 shifted based on a, M indicates a number of desired coefficients (e.g., taps), k and m are counter variables, and c is a coefficient (e.g., a tap) describing modifications to the function to fit the function to the data. Accordingly, increasing the value of M results in more coefficients c, which incorporates increasingly higher frequency characteristics of the reference samples 851 surrounding the fractional position 852 described by a. Hence, lower values of M can be used to reduce the coefficients/taps (e.g., to four taps) when the sub-block size is equal to or below a threshold and higher values of M can be used to increase the coefficients/taps when the sub-block size is greater than the threshold. Other interpolation filters may also be employed, for example as shown in FIG. 9 below.

Figure 9:
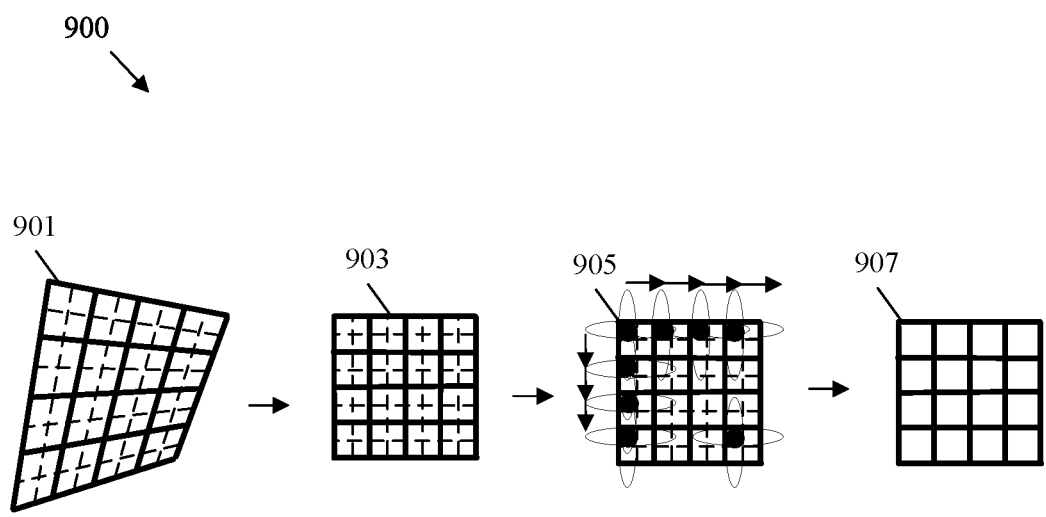
FIG. 9 is a schematic diagram illustrating an example implementation of a warping interpolation filter (WIF).

FIG. 9 is a schematic diagram illustrating an example implementation of a WIF 900. A WIF 900 is less complex than some variants of the DCT filter discussed above. Hence, the WIF 900 may be employed for sub-blocks with a size that is equal to or below a threshold. Accordingly, WIF 900 can be applied to a reference block 800 containing reference samples referred to by a current block (e.g., an affine block), such as current block 701. Hence. WIF 900 can be employed during block compression step 105, block decoding step 113, motion estimation component 221, motion compensation component 219, motion compensation component 321, and/or motion compensation component 421. WIF 900 can also be employed in conjunction with unidirectional inter-prediction 500 and/or bidirectional inter-prediction 600.

WIF 900 is applied in two stages. Specifically. WIF 900 is applied to a reference block 901. As shown, the reference block 901 is warped based on the motion of the current block so that motion vectors from the current block point to the proper reference blocks. WIF 900 applies bilinear interpolation with upscaling to the reference block 901 to create an interpolated reference block 903. The interpolated reference block 903 is a flattened block that contains interpolated reference sample values. The interpolated reference sample values of interpolated reference block 903 have been modified to compensate for warping and motion related offsets. The bold lines of interpolated reference block 903 depict values at integer positions while the dashed lines depict values at fractional positions. A sharpening filter 905 is applied to the interpolated reference block 903. The sharpening filter 905 is a five tap fixed symmetrical filter that performs down-scaling. The sharpening filter 905 is applied to integer positions as depicted by the black dots. The sharpening filter 905 alters the value at such positions based on horizontally and vertically adjacent integer and sub-integer positions as depicted by the ovals surrounding the black dots. The pixel/sample values at the half pel position from the first stage are used for convolution. This approach results in generating interpolated values at the integer positions and removing the values at the sub-integer positions as shown in filter block 907. Accordingly, application of WIF 900 results in an interpolated reference frame where motion vectors from the current block point to integer positions. Splitting interpolation in two steps in this manner allows for separation of fractional offset compensation and high-pass filtering. Also, this approach is a relatively low complexity approach due to the filters employed, specifically a two tap filter for bilinear offset compensation to create an interpolated reference block 903, a five tap sharpening filter 905 for down-scaling, and/or a three tap filter applied for high-pass filtering.

Figure 10:
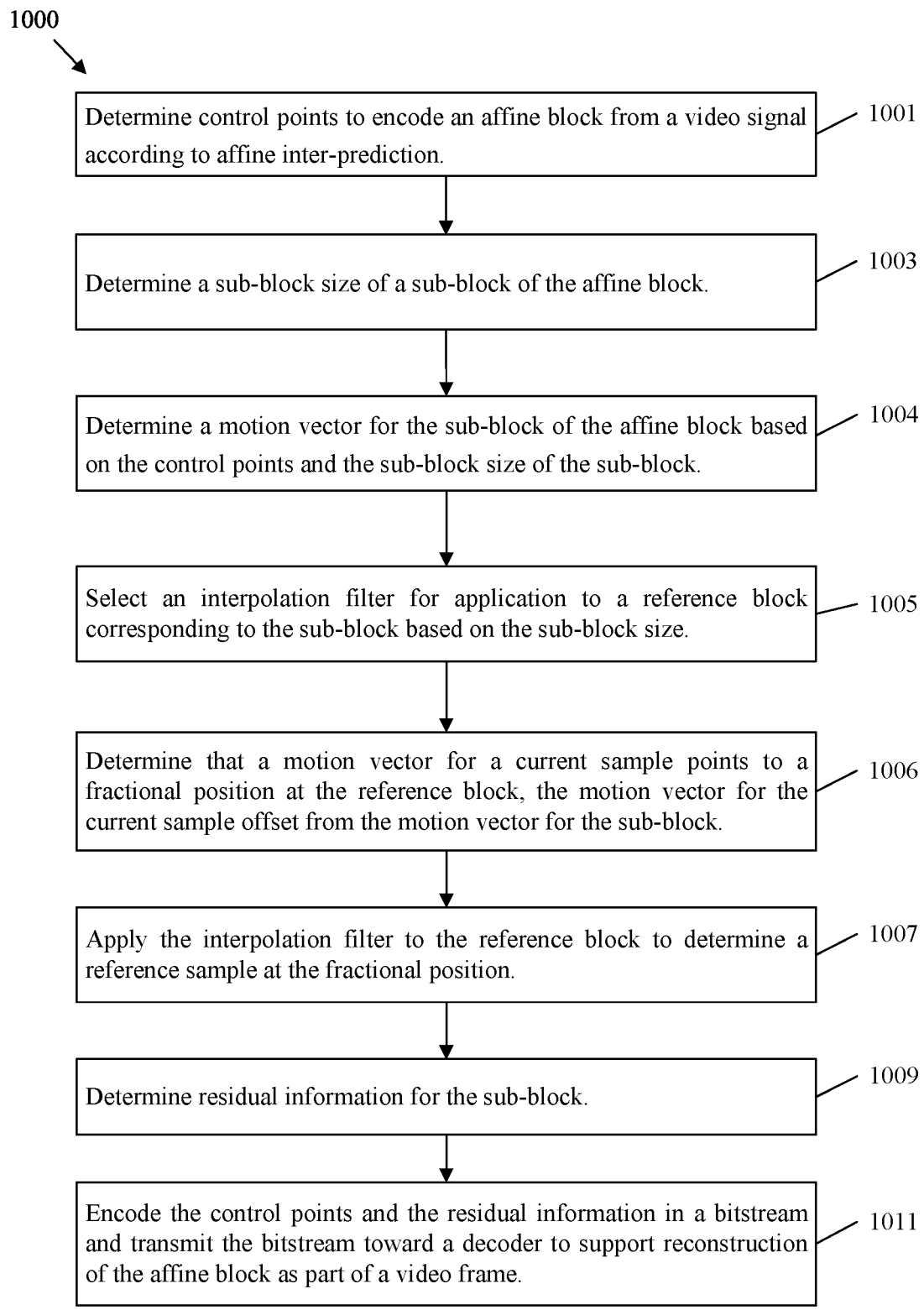
FIG. 10 is a flowchart of an example method of applying an adaptive interpolation filter at an encoder.

FIG. 10 is a flowchart of an example method 1000 of applying an adaptive interpolation filter at an encoder. Method 1000 can apply a DCT or WIF 900 filter to a reference block, such as reference block 800, to determine reference samples referred to by a current block, such as a current block employing an affine motion model 700. Method 1000 can be employed in conjunction with unidirectional inter-prediction 500 and/or bidirectional inter-prediction 600. Further, method 1000 can be employed during block compression step 105, motion estimation component 221, motion compensation component 219, and/or motion compensation component 321.

Method 1000 is employed when encoding a current block as an affine block according to affine inter-prediction. At step 1001, the encoder reviews a video signal containing the affine block. The encoder determines control points to encode the affine block according to inter-prediction. In some cases, the encoder can select a motion model to describe the motion of the affine block and then calculate the control points based on the motion model. Other mechanisms for selecting control points may also be employed. For example, the encoder can determine control points based on control points employed for adjacent blocks to the current blocks.

At step 1003, the encoder determines a sub-block size for a sub-block of the affine block. The sub-block size can be determined based on a motion vector difference between the control points for the affine block, a width of the affine block, and a height of the affine block, for example according to Equation Set 2 as discussed above. In another example, the sub-block size can be determined from a three dimensional lookup table indexed by a motion vector difference between control points for the affine block, a size of the affine block, and a motion vector precision. For example, sub-block width M can be set to a table denoted Table_M[x][v][z], where x is set equal to max $(abs(v_{1x}-v_{0x}), abs(v_{1y}-v_{0y}))$, v is set equal to the affine block width, z is set equal to the motion vector precision, and (v0x, v0y) and (v1x, v1y) are control point motion vectors. Further, sub-block height N can be set to a table denoted Table_N[x][x][z], where x is set equal to max $(abs(v_{2x}-v_{0x}), abs(v_{2y}-v_{0y}))$, y is set equal to affine block height, z is set equal to the motion vector precision, and $(v_{2x}, v_{2y})$ is also a control point vector.

At step 1004, the encoder also determines a motion vector for the sub-block of the affine block based on the control points and the sub-block size. As noted above, the motion vector may be calculated according to a weighted average of the control points, where the influence of the control points is weighted based on a distance between a predefined position of the motion vector for the sub-block and the positions of the control point motion vectors.

At step 1005, the encoder selects an interpolation filter for application to a reference block corresponding to the sub-block based on the sub-block size. The interpolation filter is employed to assist in determining reference sample values at the reference block. In order to determine a reference sample corresponding to a current sample, the encoder considers the motion vector for the sub-block and an offset between the current sample and the predefined motion vector for the sub-block. The encoder can then determine a motion vector for the current sample pointing toward the reference sample. The reference block is warped to account for motion between the affine block and the reference block. Further, motion vectors have a sub-pel accuracy. Due to the warping and the sub-pel accuracy, the motion vector for the sample may point to a non-integer position, even though the reference samples are positioned at integer positions. The interpolation filter is employed to determine reference sample values at the reference block when the motion vector for the current sample at the sub-block points to a fractional position instead of to an integer position that contains a corresponding reference sample. Specifically, the interpolation filter determines what reference sample values should be at the fractional position based on the reference sample values of other reference samples (e.g., adjacent reference samples at the integer positions).

The interpolation filter can be selected from a group of candidate interpolation filters, which creates an adaptive interpolation filter. For example, the interpolation filter can be selected to include a first number of taps when the sub-block size is greater than a threshold and can be selected to include a second number of taps when the sub-block size is less than or equal to the threshold. In this case, the first number of taps is larger than the second number of taps. This approach allows a more complicated interpolation filter to be employed for larger sub-blocks and a less complicated interpolation filter to be employed for smaller sub-blocks. As a specific example, the interpolation filter can be selected as a DCT-IF with six taps, eight taps, or twelve taps when the sub-block size is greater than the threshold. Further, the interpolation filter can be selected as a DCT-IF with four taps or six taps when the sub-block size is less than or equal to the threshold. As another example, the interpolation filter can be selected as a WIF, such as WIF 900, with five taps when the sub-block size is less than or equal to the threshold. The threshold may include values such as four, eight, sixteen, thirty two, sixty four, etc. Hence, a more complex the interpolation filter is selected for a sub-block with a side (e.g., width or height) in excess of the threshold while a less complex interpolation filter is selected for a sub-block with all sides equal to or less than the threshold.

At step 1006, the encoder determines motion vectors for the sub-block samples based on the motion vector for the sub-block. Specifically, a motion vector for a current sample is offset from the motion vector for the sub-block. When the motion vector at an offset points to an integer position at the reference block, the reference sample corresponding to the sub-block sample can be obtained. However, in step 1006 the encoder can determine that the motion vector for a current sample points to a fractional position at the reference block. In such a case, the value of the corresponding reference sample is unclear as block samples are located at integer positions.

At step 1007, the encoder applies the interpolation filter to the reference block to determine a reference sample at the fractional position. In this manner an interpolated reference sample at the fractional position is determined for the current sample.

Once the reference samples for the current samples are determined, the encoder can determine residual information for the sub-block at step 1009. Specifically, the current samples can be compared to the reference samples at the reference block. The difference between the current samples of the sub-block and the reference samples at the reference block makes up the residual information.

At step 1011, the encoder can encode the control points and the residual information in a bitstream. The control points may be encoded in a variety of different ways. For example, the control points may be encoded by an index that references motion vectors of other blocks in the frame containing the affine block. A transform may also be applied to the residual information prior to encoding for further compression. The encoder can then transmit the bitstream toward a decoder to support reconstruction of the affine block as part of a video frame. The video frame can then be added into a sequence of additional video frames to reconstruct a video for display to the end user at the decoder. By applying the adaptive interpolation filter that selects an interpolation filter of varying complexity based on sub-block size (e.g., at steps 1005 and 1007), the encoder can increase accuracy for larger sub-blocks while decreasing processing resources for smaller sub-blocks that do not realize a significant benefit for using complex interpolation filters. Accordingly, the application of the adaptive filter increases accuracy and/or decreases processing resource utilization, and hence results in improved functionality at the encoder.

Figure 11:
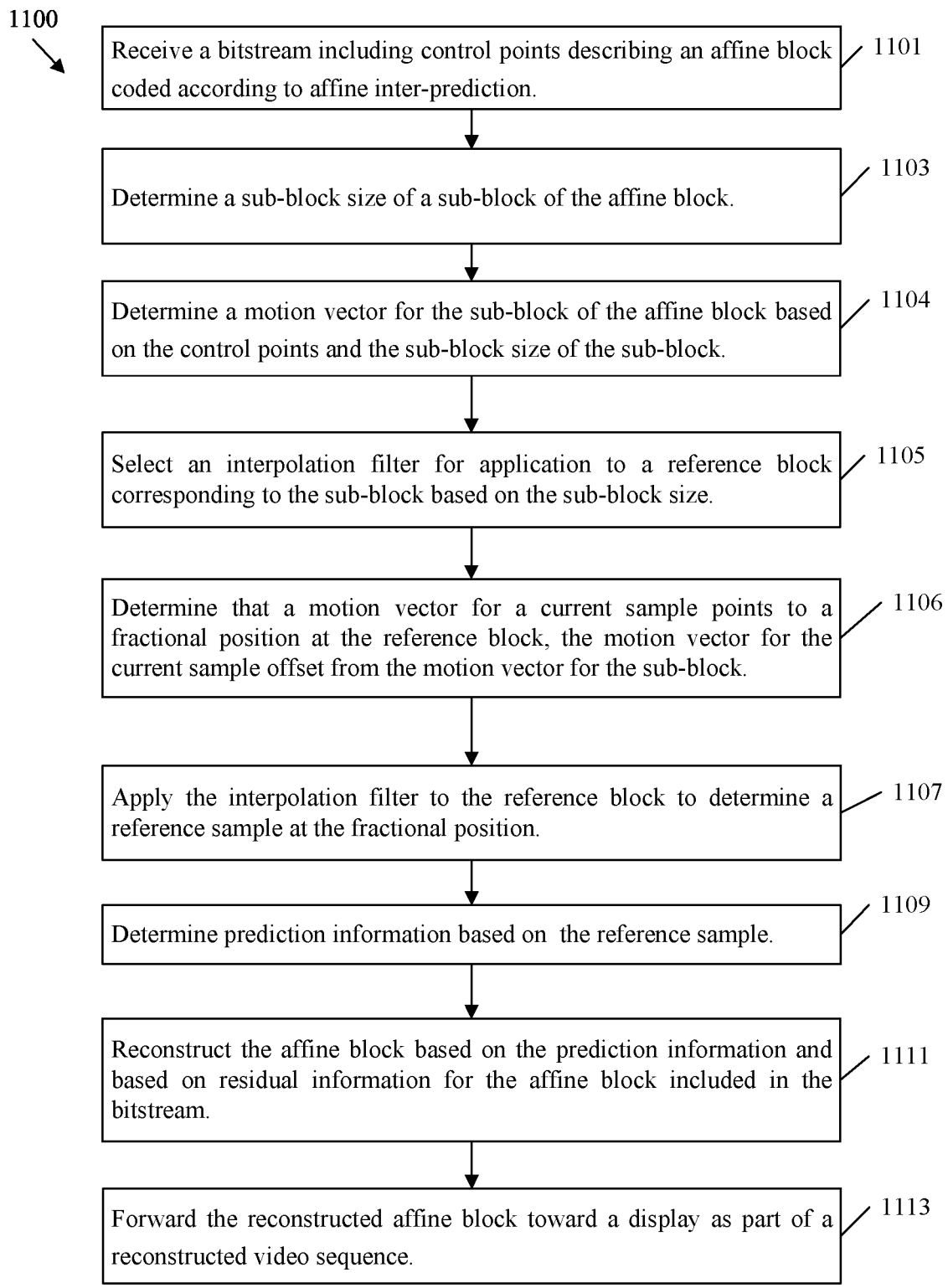
FIG. 11 is a flowchart of an example method of applying an adaptive interpolation filter at a decoder.

FIG. 11 is a flowchart of an example method 1100 of applying an adaptive interpolation filter at a decoder. Method 1100 can apply a DCT or WIF 900 filter to a reference block, such as reference block 800, to determine reference samples referred to by a current block, such as a current block employing an affine motion model 700. Method 1100 can be employed in conjunction with unidirectional inter-prediction 500 and/or bidirectional inter-prediction 600. Further, method 1100 can be employed during block compression step 105, motion estimation component 221, motion compensation component 219, and/or motion compensation component 421.

Method 1100 is employed when decoding a current block as an affine block according to affine inter-prediction. For example, method 1100 is complementary to method 1000. For example, method 1100 can be employed by a decoder to reconstruct an affine block encoded by an encoder according to method 1000. At step 1001, the decoder receives a bitstream, which includes encoded video. Specifically, the bistream includes control points describing an affine block coded according to affine inter-prediction. For example, the bitstream may include data indicating a motion model describing the motion of an object described by the affine block over a plurality of frames. As a specific example, the motion model can be indicated by an index that denotes the motion model according to a candidate list based on other blocks in a common frame. The control points can then be determined according to the indicated motion model. The forgoing is an example mechanism for encoding control points, but it should be noted that many mechanisms can be employed to encode such data. Further, the bitstream may also include residual information for the affine block as described with respect to method 1000.

At step 1103, the decoder determines a sub-block size for a sub-block of the affine block. The sub-block size can be determined based on a motion vector difference between the control points for the affine block, a width of the affine block, and a height of the affine block, for example according to Equation Set 2 as discussed above. In another example, the sub-block size can be determined from a three dimensional lookup table indexed by a motion vector difference between control points for the affine block, a size of the affine block, and a motion vector precision. For example, sub-block width M can be set to a table denoted Table_M[x][y][z], where x is set equal to max ($abs(v_{1x}-v_{0x})$, $abs(v_{1y}-v_{0y})$), y is set equal to the affine block width, z is set equal to the motion vector precision, and (v0x, v0y) and (v1x, v1y) are control point motion vectors. Further, sub-block height N can be set to a table denoted Table_N[x][y][z], where x is set equal to max ($abs(v_{2x}-v_{0x})$, $abs(v_{2y}-v_{0y})$) y is set equal to affine block height, z is set equal to the motion vector precision, and (v2x, v2y) is also a control point vector.

At step 1104, the decoder also determines a motion vector for the sub-block of the affine block based on the control points and the sub-block size. As noted above, the motion vector may be calculated according to a weighted average of the control points, where the influence of the control points is weighted based on a distance between a predefined position of the motion vector for the sub-block and the positions of the control point motion vectors.

At step 1105, the decoder selects an interpolation filter for application to a reference block corresponding to the sub-block. Specifically, the interpolation filter is selected based on the sub-block size. The interpolation filter is employed to assist in determining reference sample values at the reference block. In order to determine a reference sample corresponding to a current sample, the decoder considers the motion vector for the sub-block and an offset between the current sample and the predefined motion vector for the sub-block. The decoder can then determine a motion vector for the current sample pointing toward the reference sample. The reference block is warped to account for motion between the affine block and the reference block. Further, motion vectors have a sub-pel accuracy. Due to the warping and the sub-pel accuracy, the motion vector for the sample may point to a non-integer position, even though the reference samples are positioned at integer positions. The interpolation filter is employed to determine reference sample values at the reference block when the motion vector for the current sample at the sub-block points to a fractional position instead of to an integer position that contains a corresponding reference sample. Specifically, the interpolation filter determines what reference sample values should be at the fractional position based on the reference sample values of other reference samples (e.g., adjacent reference samples at the integer positions).

The interpolation filter can be selected from a group of candidate interpolation filters, which creates an adaptive interpolation filter. For example, the interpolation filter can be selected to include a first number of taps when the sub-block size is greater than a threshold and can be selected to include a second number of taps when the sub-block size is less than or equal to the threshold. In this case, the first number of taps is larger than the second number of taps. This approach allows a more complicated interpolation filter to be employed for larger sub-blocks and a less complicated interpolation filter to be employed for smaller sub-blocks. As a specific example, the interpolation filter can be selected as a DCT-IF with six taps, eight taps, or twelve taps when the sub-block size is greater than the threshold. Further, the interpolation filter can be selected as a DCT-IF with four taps or six taps when the sub-block size is less than or equal to the threshold. As another example, the interpolation filter can be selected as a WIF, such as WIF 900, with five taps when the sub-block size is less than or equal to the threshold. The threshold may include values such as four, eight, sixteen, thirty two, sixty four, etc. Hence, a more complex the interpolation filter is selected for a sub-block with a side (e.g., width or height) in excess of the threshold while a less complex interpolation filter is selected for a sub-block with all sides equal to or less than the threshold.

At step 1106, the decoder determines motion vectors for the sub-block samples based on the motion vector for the sub-block. Specifically, a motion vector for a current sample is offset from the motion vector for the sub-block. When the motion vector at an offset points to an integer position at the reference block, the reference sample corresponding to the sub-block sample can be obtained. However, in step 1106 the decoder can determine that the motion vector for a current sample points to a fractional position at the reference block. In such a case, the value of the corresponding reference sample is unclear as block samples are located at integer positions.

At step 1107, the decoder applies the interpolation filter to the reference block to determine a reference sample at the fractional position. In this manner an interpolated reference sample at the fractional position is determined for the current sample.

At step 1109, the decoder determines prediction information based on the reference sample. For example, prediction information for the affine block includes the reference samples from the corresponding reference block(s) determined according to step 1107. The affine block is then reconstructed at step 1111 based on the prediction information and based on the residual information for the affine block included in the bitstream. Specifically, the reference samples employed as prediction information are modified based on the residual information. The residual information contains the difference between the reference samples and the affine block as encoded at the encoder. Accordingly, applying the residual information to the reference samples results in a reconstructed affine block that is substantially similar to the affine block encoded at the encoder. The reconstructed affine block can then be forwarded toward a display as part of a reconstructed video sequence at step 1113. Specifically, the affine block can be included in a reconstructed frame, which is then positioned in sequence with other reconstructed frames to yield the reconstructed video sequence. By applying the adaptive interpolation filter that selects an interpolation filter of varying complexity based on sub-block size (e.g., at steps 1105 and 1107), the decoder can increase accuracy for larger sub-blocks while decreasing processing resources for smaller sub-blocks that do not realize a significant benefit for using complex interpolation filters. Accordingly, the application of the adaptive filter increases accuracy and/or decreases processing resource utilization, and hence results in improved functionality at the decoder.

Figure 12:
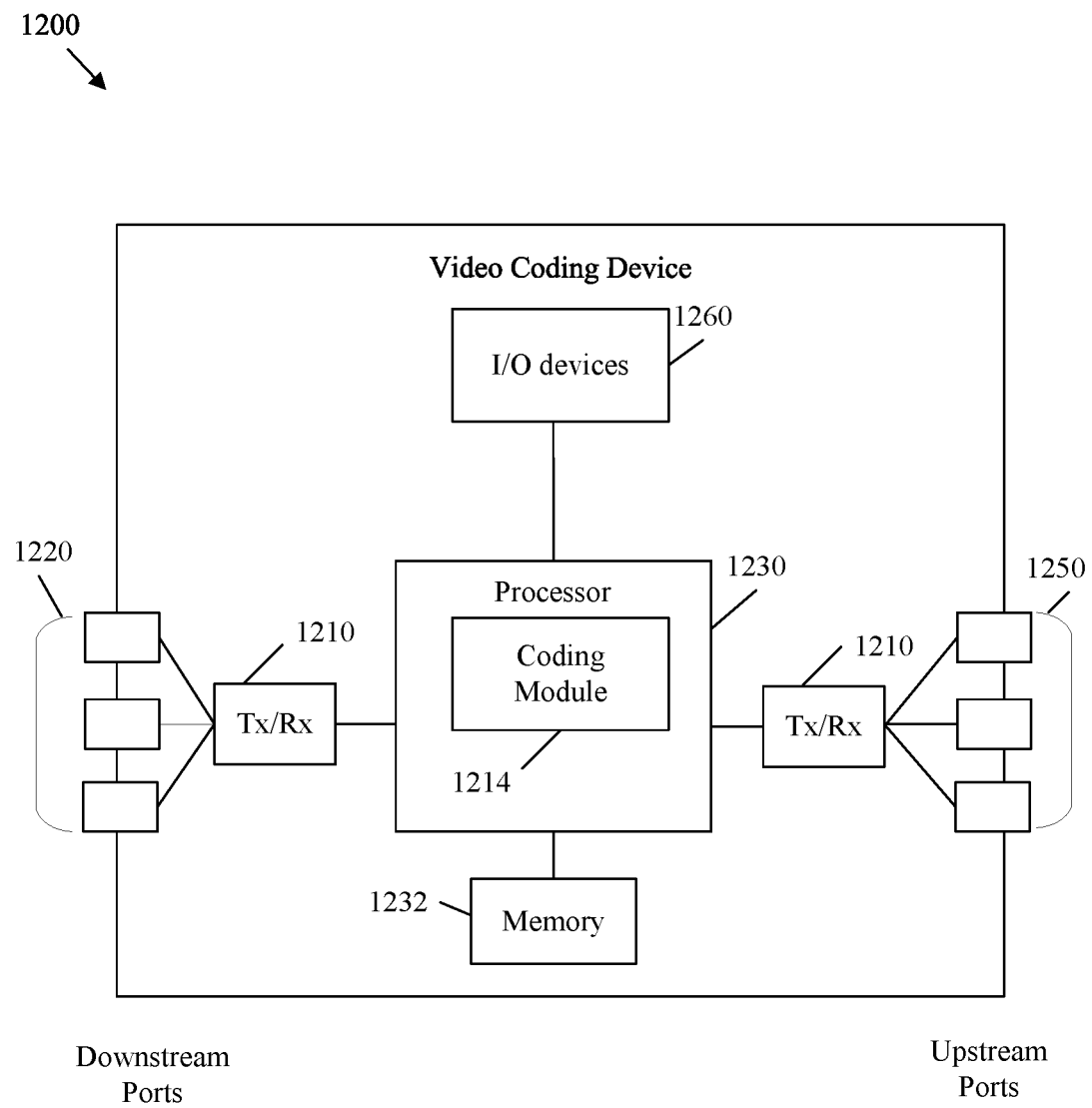
FIG. 12 is a schematic diagram of an example video coding device.

FIG. 12 is a schematic diagram of an example video coding device 1200 according to an embodiment of the disclosure. The video coding device 1200 is suitable for implementing the disclosed examples/embodiments as described herein. The video coding device 1200 comprises downstream ports 1220, upstream ports 1250, and/or transceiver units (Tx/Rx) 1210, including transmitters and/or receivers for communicating data upstream and/or downstream over a network. The video coding device 1200 also includes a processor 1230 including a logic unit and/or central processing unit (CPU) to process the data and a memory 1232 for storing the data. The video coding device 1200 may also comprise optical-to-electrical (OE) components, electrical-to-optical (EO) components, and/or wireless communication components coupled to the upstream ports 1250) and/or downstream ports 1220 for communication of data via optical or wireless communication networks. The video coding device 1200 may also include input and/or output (I/O) devices 1260 for communicating data to and from a user. The I/O devices 1260 may include output devices such as a display for displaying video data, speakers for outputting audio data, etc. The I/O devices 1260 may also include input devices, such as a keyboard, mouse, trackball, etc., and/or corresponding interfaces for interacting with such output devices.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the downstream ports 1220, Tx/Rx 1010, upstream ports 1250, and memory 1232. The processor 1230 comprises a coding module 1214. The coding module 1214 implements the disclosed embodiments described above, such as methods 100, 1000, and/or 1100, unidirectional inter-prediction 500, bidirectional inter-prediction 600, and/or any other method/mechanism described herein. For example, the coding module 1214 can implement inter-prediction according to an affine motion model 700 to determine reference samples from a reference block 800, for example by employing a DCT-IF and/or a WIF 900. Further, the coding module 1214 may implement a codec system 200, an encoder 300, and/or a decoder 400. Accordingly, coding module 1214 can be employed to determine a sub-block size for an affine block. Further, the coding module 1214 can select and apply an interpolation filter to a reference block based on the sub-block size. Application of the interpolation filter determines the reference samples for the affine block when motion vectors point to fractional positions at the reference block. By selecting the interpolation filter based on sub-block size, an adaptive interpolation filter is generated. The adaptive interpolation filter applies a less complex interpolation filter for sub-blocks that are at or below a threshold size and applies a more complex interpolation filter for sub-blocks that are above a threshold size. This increases accuracy for larger sub-blocks while decreasing processing resources for smaller sub-blocks that do not realize a significant benefit for using complex interpolation filters. Accordingly, the application of the adaptive filter increases accuracy and/or decreases processing resource utilization, and hence results in improved functionality at the video coding device 1200. Further, coding module 1214 effects a transformation of the video coding device 1200 to a different state. Alternatively, the coding module 1214 can be implemented as instructions stored in the memory 1232 and executed by the processor 1230 (e.g., as a computer program product stored on a non-transitory medium).

The memory 1232 comprises one or more memory types such as disks, tape drives, solid-state drives, read only memory (ROM), random access memory (RAM), flash memory, ternary content-addressable memory (TCAM), static random-access memory (SRAM), etc. The memory 1232 may be used as an over-flow data storage device, to store programs when such programs are selected for execution, and to store instructions and data that are read during program execution.

Figure 13:
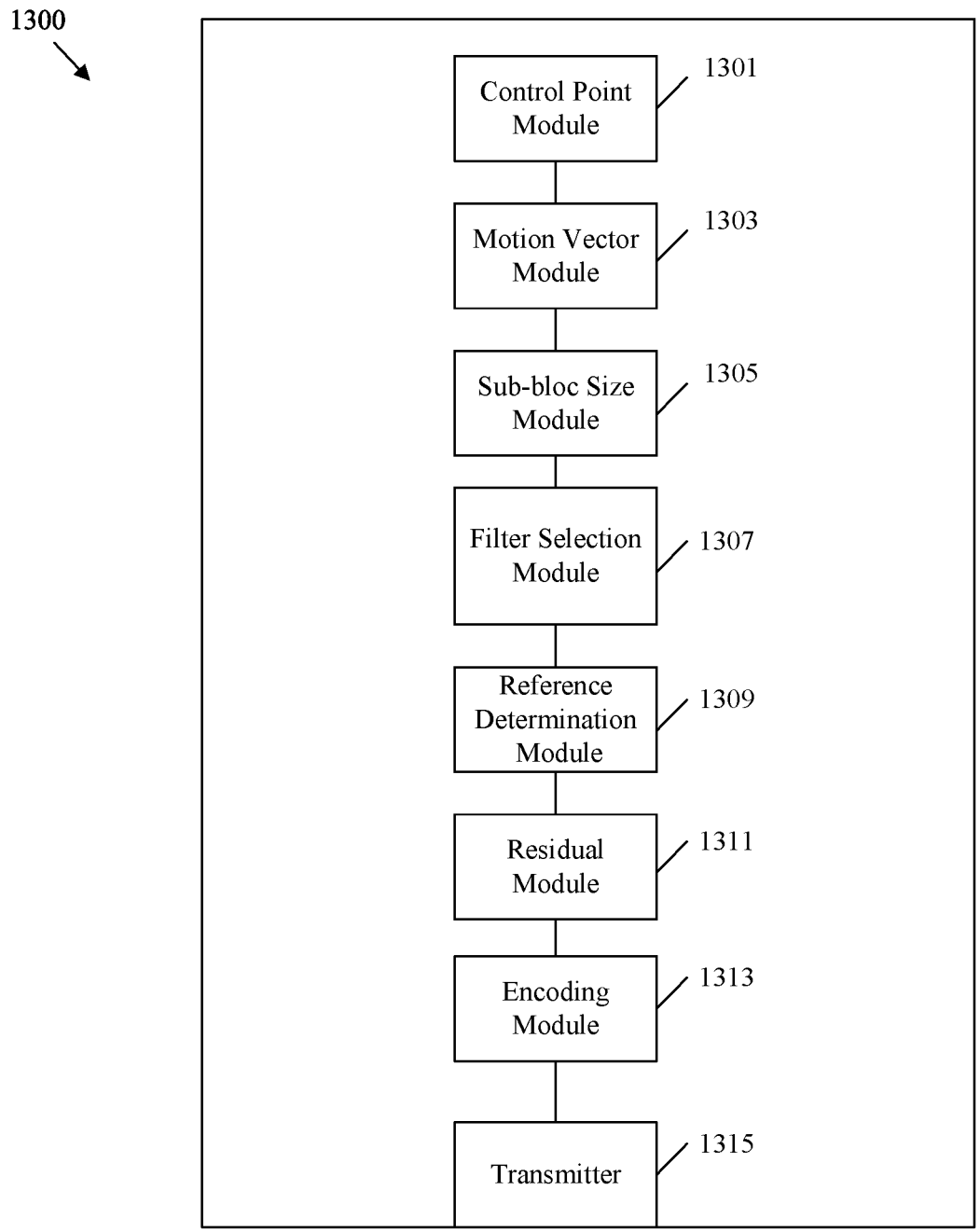
FIG. 13 is an embodiment of an encoding device for applying an adaptive interpolation filter.

FIG. 13 is an embodiment of an encoding device 1300 for applying an adaptive interpolation filter. The encoding device 1300 may include a control point module 1301 for determining control points to encode an affine block from a video signal according to affine inter-prediction. The encoding device 1300 may also include a motion vector module 1303 for determining a motion vector for a sub-block of the affine block based on the control points. The encoding device 1300 may also include a sub-block size module 1305 for determining a sub-block size of the sub-block. The encoding device 1300 may also include a filter selection module 1307 for selecting an interpolation filter for application to a reference block corresponding to the sub-block, the interpolation filter selected based on the sub-block size. The encoding device 1300 may also include a reference determination module 1309 for determining that a motion vector for a current sample points to a fractional position at the reference block, the motion vector for the current sample offset from the motion vector for the sub-block, and applying the interpolation filter to the reference block to determine a reference sample at the fractional position. The encoding device 1300 may also include a residual module 1311 for determining residual information for the sub-block based on a difference between the current sample of the sub-block and the reference sample at the reference block. The encoding device 1300 may also include an encoding module 1313 for encoding the control points and the residual information in a bitstream. The encoding device 1300 may also include a transmitting module 1315 for transmitting the bitstream toward a decoder to support reconstruction of the affine block as part of a video frame.

Figure 14:
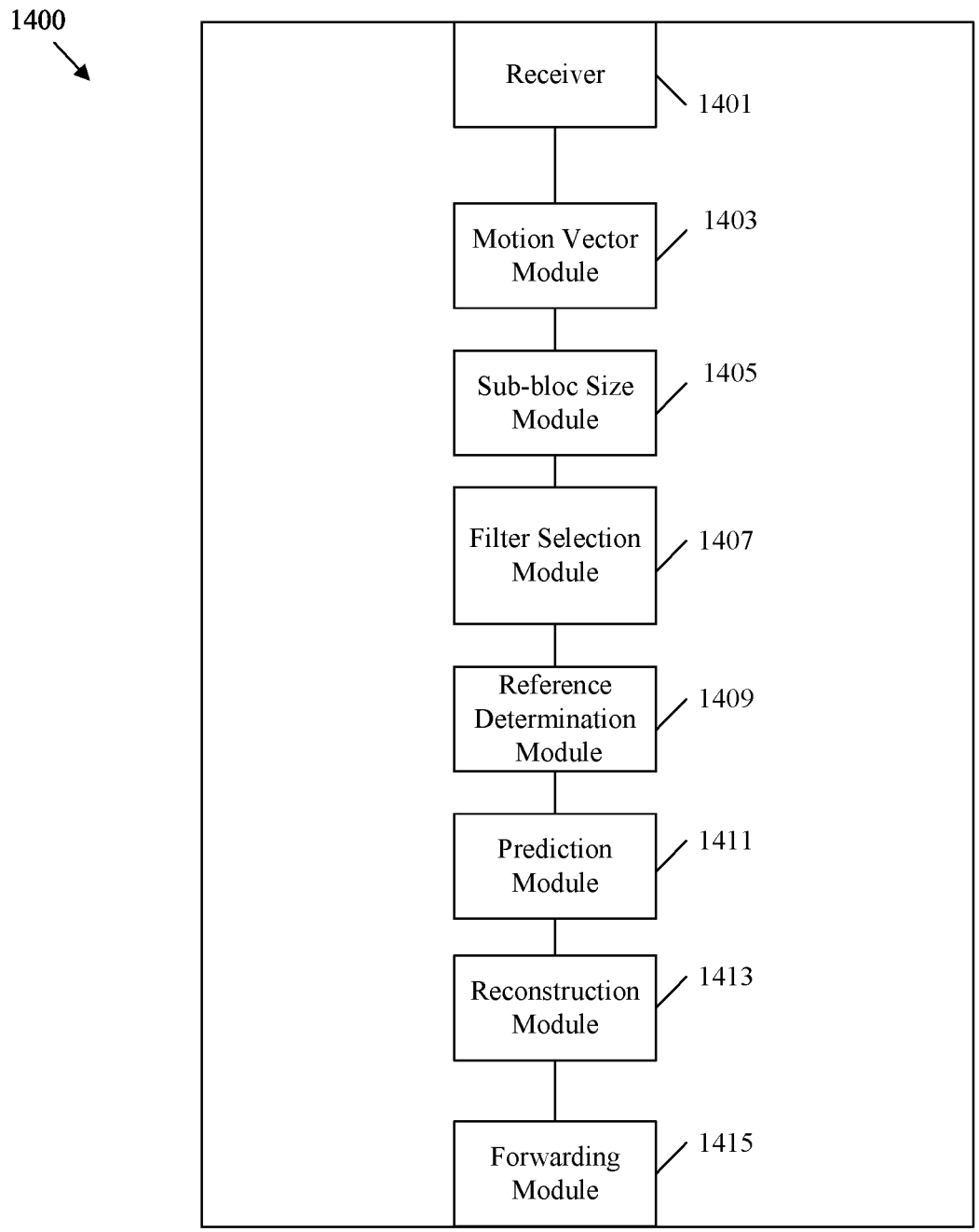
FIG. 14 is an embodiment of a decoding device for applying an adaptive interpolation filter.

FIG. 14 is an embodiment of a decoding device 1400 for applying an adaptive interpolation filter. The decoding device 1400 may include a receiving module 1401 for receiving a bitstream including control points describing an affine block coded according to affine inter-prediction. The decoding device 1400 may also include a motion vector module 1403 for determining a motion vector for a sub-block of the affine block based on the control points. The decoding device 1400 may also include a sub-block size module 1405 for determining a sub-block size of the sub-block. The decoding device 1400 may also include a filter selection module 1407 for selecting an interpolation filter for application to a reference block corresponding to the sub-block, the interpolation filter selected based on the sub-block size. The decoding device 1400 may also include a reference determination module 1409 for determining that a motion vector for a current sample points to a fractional position at the reference block, the motion vector for the current sample offset from the motion vector for the sub-block, and applying the interpolation filter to the reference block to determine a reference sample at the fractional position. The decoding device 1400 may also include a prediction module 1411 for determining prediction information based on the reference sample. The decoding device 1400 may also include a reconstructing module 1413 for reconstructing the affine block based on the prediction information and based on residual information for the affine block included in the bitstream. The decoding device 1400 may also include a forwarding module 1415 for forwarding the reconstructed affine block toward a display as part of a reconstructed video sequence.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a video coding device, the method comprising:
receiving a bitstream describing an affine block coded according to affine inter-prediction;
determining motion vectors for the affine block based on the bitstream;
determining a sub-block size of a sub-block based on the motion vectors for the affine block;
selecting an interpolation filter for application to a reference block corresponding to the sub-block, the interpolation filter selected based on the sub-block size;
determining which fractional position at the reference block a motion vector for a current sample points to;
applying the interpolation filter to the reference block to determine prediction information based on the fractional position; and
reconstructing the affine block based on the prediction information and based on residual information for the affine block described in the bitstream.

2. The method of claim 1, wherein control points describe the affine block.

3. The method of claim 1, wherein the interpolation filter is selected to include a first number of taps when the sub-block size is greater than a threshold and is selected to include a second number of taps when the sub-block size is less than or equal to the threshold, and wherein the first number of taps is larger than the second number of taps.

4. The method of claim 3, wherein the interpolation filter is selected as a discrete cosine transform interpolation filter (DCT-IF) with eight taps when the sub-block size is greater than the threshold.

5. The method of claim 3, wherein the interpolation filter is selected as a discrete cosine transform interpolation filter (DCT-IF) with four taps or six taps when the sub-block size is less than or equal to the threshold.

6. The method of claim 3, wherein the interpolation filter is selected as a warping interpolation filter (WIF) with five taps when the sub-block size is less than or equal to the threshold.

7. A video coding device, comprising:
a memory storing instructions; and
one or more processors coupled to the memory, wherein the one or more processors are configured to execute the instructions to cause the video coding device to:
receive a bitstream describing an affine block coded according to affine inter-prediction;
determine motion vectors for the affine block based on the bitstream;
determine a sub-block size of a sub-block based on the motion vectors for the affine block;
select an interpolation filter for application to a reference block corresponding to the sub-block, the interpolation filter selected based on the sub-block size;
determine which fractional position at the reference block a motion vector for a current sample points to;
apply the interpolation filter to the reference block to determine prediction information based on the fractional position; and
reconstruct the affine block based on the prediction information and based on residual information for the affine block described in the bitstream.

8. The video coding device of claim 7, wherein control points describe the affine block.

9. The video coding device of claim 7, wherein the interpolation filter is selected to include a first number of taps when the sub-block size is greater than a threshold and is selected to include a second number of taps when the sub-block size is less than or equal to the threshold, and wherein the first number of taps is larger than the second number of taps.

10. The video coding device of claim 9, wherein the interpolation filter is selected as a discrete cosine transform interpolation filter (DCT-IF) with eight taps when the sub-block size is greater than the threshold.

11. The video coding device of claim 9, wherein the interpolation filter is selected as a discrete cosine transform interpolation filter (DCT-IF) with four taps or six taps when the sub-block size is less than or equal to the threshold.

12. The video coding device of claim 9, wherein the interpolation filter is selected as a warping interpolation filter (WIF) with five taps when the sub-block size is less than or equal to the threshold.

13. A non-transitory computer readable medium comprising a computer program product for use by a video coding device, the computer program product comprising computer executable instructions stored on the non-transitory computer readable medium that, when executed by one or more processors, cause the video coding device to:
receive a bitstream describing an affine block coded according to affine inter-prediction;
determine motion vectors for the affine block based on the bitstream;
determine a sub-block size of a sub-block based on the motion vectors for the affine block;
select an interpolation filter for application to a reference block corresponding to the sub-block, the interpolation filter selected based on the sub-block size;
determine which fractional position at the reference block a motion vector for a current sample points to;
apply the interpolation filter to the reference block to determine prediction information based on the fractional position; and
reconstruct the affine block based on the prediction information and based on residual information for the affine block described in the bitstream.

14. The non-transitory computer readable medium of claim 13, wherein control points describe the affine block.

15. The non-transitory computer readable medium of claim 13, wherein the interpolation filter is selected to include a first number of taps when the sub-block size is greater than a threshold and is selected to include a second number of taps when the sub-block size is less than or equal to the threshold, and wherein the first number of taps is larger than the second number of taps.

16. The non-transitory computer readable medium of claim 15, wherein the interpolation filter is selected as a discrete cosine transform interpolation filter (DCT-IF) with eight taps when the sub-block size is greater than the threshold.

17. The non-transitory computer readable medium of claim 15, wherein the interpolation filter is selected as a discrete cosine transform interpolation filter (DCT-IF) with four taps or six taps when the sub-block size is less than or equal to the threshold.

18. The non-transitory computer readable medium of claim 15, wherein the interpolation filter is selected as a warping interpolation filter (WIF) with five taps when the sub-block size is less than or equal to the threshold.

19. The method of claim 1, wherein the sub-block size comprises a sub-block height or a sub-block width of 8 pixels.

20. The video coding device of claim 7, wherein the sub-block size comprises a sub-block height or a sub-block width of 8 pixels.

* * * * *

UNITED STATES PATENT AND TRADEMARK OFFICE
CERTIFICATE OF CORRECTION

| | | |
|---|---|---|
| PATENT NO. | : 12,069,293 B2 | Page 1 of 1 |
| APPLICATION NO. | : 17/472235 | |
| DATED | : August 20, 2024 | |
| INVENTOR(S) | : Huanbang Chen et al. | |

It is certified that error appears in the above-identified patent and that said Letters Patent is hereby corrected as shown below:

On the Title Page

Column 2, Line 2 (56) References Cited, Foreign Patent Documents:
Delete "EP 2624558 A2 7/2013".

Signed and Sealed this
First Day of October, 2024

Katherine Kelly Vidal
Director of the United States Patent and Trademark Office